(12) United States Patent
Eder

(10) Patent No.: US 7,970,640 B2
(45) Date of Patent: Jun. 28, 2011

(54) PURCHASING OPTIMIZATION SYSTEM

(75) Inventor: Jeff Scott Eder, Mill Creek, WA (US)

(73) Assignee: Asset Trust, Inc., Bothell, WA (US)

( * ) Notice: Subject to any disclaimer, the term of this patent is extended or adjusted under 35 U.S.C. 154(b) by 1876 days.

(21) Appl. No.: 10/166,758

(22) Filed: Jun. 12, 2002

(65) Prior Publication Data

US 2005/0119900 A1 Jun. 2, 2005

(51) Int. Cl.
*G06Q 10/00* (2006.01)
*G06Q 40/00* (2006.01)
(52) U.S. Cl. .................................... 705/7.28
(58) Field of Classification Search .................. None
See application file for complete search history.

(56) References Cited

U.S. PATENT DOCUMENTS

| | | |
|---|---|---|
| 3,749,892 A | 7/1973 | Stenning |
| 3,933,305 A | 1/1976 | Murphy |
| 4,839,804 A | 6/1989 | Roberts et al. |
| 4,989,141 A | 1/1991 | Lyons |
| 5,128,861 A | 7/1992 | Kagami |
| 5,191,522 A | 3/1993 | Bosco et al. |
| 5,193,055 A | 3/1993 | Brown |
| 5,224,034 A | 6/1993 | Katz |
| 5,237,495 A | 8/1993 | Morii |
| 5,237,946 A | 8/1993 | Copson |
| 5,317,504 A | 5/1994 | Nakayama |
| 5,361,201 A | 11/1994 | Jost et al. |
| 5,406,477 A | 4/1995 | Harhen |
| 5,414,621 A | 5/1995 | Hough |
| 5,471,611 A | 11/1995 | McGregor |
| 5,615,109 A * | 3/1997 | Eder ........................ 705/8 |
| 5,644,727 A | 7/1997 | Atkins |
| 5,649,181 A | 7/1997 | French et al. |
| 5,668,591 A | 9/1997 | Shintani |
| 5,680,305 A | 10/1997 | Apgar |
| 5,704,045 A | 12/1997 | King et al. |
| 5,704,055 A | 12/1997 | George et al. |
| 5,706,495 A | 1/1998 | Chadha et al. |
| 5,737,581 A | 4/1998 | Keane |
| 5,742,775 A | 4/1998 | King |
| 5,774,873 A | 6/1998 | Berent |
| 5,794,219 A | 8/1998 | Brown |
| 5,799,287 A * | 8/1998 | Dembo ........................ 705/36 R |
| 5,802,501 A | 9/1998 | Graff |
| 5,809,282 A | 9/1998 | Cooper |
| 5,812,987 A | 9/1998 | Luskin et al. |
| 5,812,988 A | 9/1998 | Sandretto |
| 5,819,237 A | 10/1998 | Garman |
| 5,875,431 A | 2/1999 | Heckman et al. |

(Continued)

FOREIGN PATENT DOCUMENTS

EP 0 587 290 A2 3/1994

(Continued)

OTHER PUBLICATIONS

Green et al. Models and Heuristics for Product Line Selection. Marketing Science, vol. 4, No. 1 (Winter, 1985), p. 1-19.*

(Continued)

*Primary Examiner* — Romain Jeanty
*Assistant Examiner* — Brandi P Parker

(57) ABSTRACT

An automated system, method and media for optimizing the impact of a subset of an organization such as purchasing on the financial performance of said organization.

63 Claims, 16 Drawing Sheets

U.S. PATENT DOCUMENTS

| | | | |
|---|---|---|---|
| 6,064,971 | A | 5/2000 | Hartnett |
| 6,064,972 | A | 5/2000 | Jankowitz et al. |
| 6,073,115 | A | 6/2000 | Marshall |
| 6,078,901 | A | 6/2000 | Ching |
| 6,088,678 | A | 7/2000 | Shannon |
| 6,092,056 | A | 7/2000 | Tull, Jr. et al. |
| 6,112,188 | A | 8/2000 | Hartnett |
| 6,125,355 | A | 9/2000 | Bekaert et al. |
| 6,134,536 | A | 10/2000 | Shepherd |
| 6,148,293 | A | 11/2000 | King |
| 6,173,276 | B1 | 1/2001 | Kant |
| 6,189,011 | B1 | 2/2001 | Lim et al. |
| 6,209,124 | B1 | 3/2001 | Vermeire et al. |
| 6,263,314 | B1 | 7/2001 | Donner |
| 6,278,981 | B1 | 8/2001 | Dembo et al. |
| 6,282,531 | B1 | 8/2001 | Haughton et al. |
| 6,301,584 | B1 | 10/2001 | Ranger |
| 6,317,787 | B1 | 11/2001 | Boyd et al. |
| 6,332,163 | B1 | 12/2001 | Bowman-Amuah |
| 6,366,934 | B1 | 4/2002 | Cheng et al. |
| 6,418,448 | B1 | 7/2002 | Sarkar |
| 6,584,507 | B1 | 6/2003 | Bradley et al. |
| 6,591,232 | B1* | 7/2003 | Kassapoglou .................... 703/2 |
| 6,671,673 | B1 | 12/2003 | Baseman et al. |
| 6,732,095 | B1 | 5/2004 | Warshavsky et al. |
| 6,738,753 | B1 | 5/2004 | Hogan |
| 6,836,773 | B2 | 12/2004 | Tamayo et al. |
| 6,876,992 | B1 | 4/2005 | Sullivan |
| 7,006,992 | B1 | 2/2006 | Packwood |
| 7,058,587 | B1* | 6/2006 | Horne .............................. 705/7 |
| 7,080,027 | B2 | 7/2006 | Luby et al. |
| 7,246,080 | B2 | 7/2007 | Feldman et al. |
| 7,260,550 | B1 | 8/2007 | Notani |
| 7,283,982 | B2 | 10/2007 | Pednault |
| 7,337,137 | B2 | 2/2008 | Zosin et al. |
| 7,395,236 | B2 | 7/2008 | Degraaf et al. |
| 7,409,357 | B2 | 8/2008 | Schaf et al. |
| 7,433,809 | B1 | 10/2008 | Guirguis |
| 7,536,332 | B2 | 5/2009 | Rhee |
| 7,552,085 | B2 | 6/2009 | Amburn |
| 7,552,095 | B2 | 6/2009 | Kalyan |
| 7,590,937 | B2 | 9/2009 | Jacobus et al. |
| 7,653,449 | B2 | 1/2010 | Hunter et al. |
| 2001/0011243 | A1 | 8/2001 | Dembo et al. |
| 2002/0002520 | A1 | 1/2002 | Gatto |
| 2002/0016758 | A1 | 2/2002 | Grigsby |
| 2002/0023034 | A1 | 2/2002 | Brown et al. |
| 2002/0052820 | A1 | 5/2002 | Gatto |
| 2003/0055664 | A1* | 3/2003 | Suri ................................. 705/1 |
| 2003/0069986 | A1* | 4/2003 | Petrone et al. ................ 709/232 |
| 2003/0083973 | A1 | 5/2003 | Horsfall |
| 2003/0176931 | A1 | 9/2003 | Pednault et al. |

FOREIGN PATENT DOCUMENTS

| | | |
|---|---|---|
| GB | 2 253 081 A | 2/1992 |
| WO | WO 98 38 588 | 2/1997 |

OTHER PUBLICATIONS

Webster's New World Dictionary, Definition of "matrix", http://www.yourdictionary.com/matrix.*

Mullen, Maggie; How to value intangibles; Nov. 1993; pp. 92-94, V112, Accountancy, U.K.

Lippitt, Jeffrey & Mastracchio, Nicholas, Developing capitalization rates for valuing a business, Nov. 1995, pp. 24-28, V65, The CPA Journal, U.S.A.

McTaggert, James, Kontes, Peter and Mankins, Michael, The value imperative, 1994, pp. 1-350, The Free Press, U.S.A.

Rappaport, Alfred; Creating shareholder value; 1986 & 1998, pp. 1-195, The Free Press, U.S.A.

Ritchken, Peter, Options, Theory, Strategy and Applications, 1987, pp. 1-407, Foresman and Company, U.S.A.

Dixit, Avinash & Pindyck, Robert; Investment under uncertainty; 1994; pp. 3-444, Princeton University Press, U.S.A.

Garson, David; Interpreting neural network connection weights, Apr. 1, 1991, pp. 47-51, AI Expert, U.S.A.

Brealey, Richard & Myers, Stewart; Principles of Corporate Finance; 1991; pp. 1-741, McGraw Hill, U.S.A.

Ernst & Young, Measures that Matter, 1997, pp. 1-16, Ernst & Young Center for Business Innovation, U.S.A.

Hendriksen, Elden, Accounting theory, 1982, pp. 1-524, Richard D. Irwin, U.S.A.

Brown, Carol; Coakley, James; Phillips, Mary Ellen, Neural Networks Enter World of Mgmt Accounting, May 1995, pp. 51-57, V76, Management Accounting, US.

Bielinski, Daniel, "How to sort out the premium drivers of post deal value", Jul./ Aug. 1993, pp. 33-37, V28, Mergers & Acquisitions, U.S.A.

Neurosolutions, Application Summaries from web site, Apr. 1999.

Franke, Jurgen, Hardle, Wolfgang, et al; Measuring Risk in Complex Stochastic Systems; 2000, pp. 1-255, Springer, U.S.A.

Shimpi, Prakash, Integrating Corporate Risk Management, 1999 & 2001, pp. 3-266, Texere, LLC, U.S.A.

Copeland, Tom, Koller, Tim, Murrin, Jack, Valuation, 1990, pp. 1-413, John Wiley and Sons, U.S.A.

Brisys, Eric, De Varenne, Francois, Insurance from underwriting to derivatives, 2001, pp. 1-158, John Wiley and Sons, Inc., U.S.A.

Dowd, Kevin, Beyond Value at Risk, 1998, pp. 3-266, John Wiley & Sons, U.K.

Mauboussin, Michael, "Get Real", Jun. 23, 1999, pp. 3-30, Credit Suisse First Boston, U.S.A.

Eder, Jeff, Hard facts about soft assets (and real options), Apr. 3, 2001, pp. 1-54, Casualty Actuary Society Seminar on Enterprise Risk Management, U.S.A.

Alexander, Carol, Risk Management and Analysis, 1998, pp. 1-275, John Wiley and Sons, U.S.A.

Quinn, James Brian, Intelligent Enterprise, 1992, pp. 3-458, The Free Press, U.S.A.

Fowler, Martin; Analysis Patterns: Reusable Object Models, 1997, pp. 1-342, Addison Wesley, U.S.A.

Caouette, John, Altman, Edward & Narayanan, Paul, Managing Credit Risk, 1998, pp. 1-442, John Wiley and Sons, Inc., U.S.A.

Fahy, Martin, Strategic Enterprise Management Systems, 2002, pp. 1-177, AICPA, U.S.A.

Hull, John C., Options, futures and other derivatives, 2000, pp. 1-371, Prentice Hall. U.S.A.

Eder, Jeff, "Economics of sustainable design", from Resource Guide for Sustainable Development, pp. 25-43, Vulcan Real Estate, Oct. 4, 2002, Seattle, WA.

Roll, Richard, "A Mean/Variance Analysis of Tracking Error", pp. 13-22, V18, Summer 1992, Journal of Portfolio Management, U.S.A.

Myers, Randy, "Measure for Measure", Nov. 1, 1997, pp. 31-37, CFO Magazine, U.S.A.

Hildenbrand, Carol, "Putting two and two together", pp. 1-8, Jan. 2002, Darwin Magazine, U.S.A.

University of Maryland University College, "Intelligent Agents and how they are changing our learning", UMUC website, Aug. 20, 2003.

Hochman, Jonathan, "Search Marketing and Web Page Download Speed", Sep. 5, 2007, searchengineland.com.

Hypknowsys, "Web-Log Preparaton with WUM Prep", Oct. 18, 2005, www.sourceforge.com.

Halford, Graeme, Baker, Rosemary, Bain, John, "How many variables can a human process", Psychological Science, Jan. 2005, pp. 70-76, V16, U.S.A.

Brous, Peter, Declaration Under Rule 132 for U.S. Appl. No. 10/287,586, pp. 1-2, Jul. 21, 2008.

Rauenzahn, Rick, Declaration Under Rule 132 for U.S. Appl. No. 10/821,504, pp. 1-6, Jul. 11, 2008.

Ballow, John; Burgman, Roland;Burgoz, Scott; "Enhanced Business Reporting" ; Oct. 2004, pp. 1-30, Asset Economics, U.S.A.

Charoenrook, Anchanda; "Does Sentiment Matter?"; Dec. 2003, pp. 1-44, Financial Management Association International, U.S.A.

Bandopadhyaya, Arindam, Jones, Anne Leah; "Measuring investor sentiment in equity markets"; Feb. 2006, v7, pp. 208-215, Journal Asset Management, U.S.A.

PHYSORG.COM, "How much information is too much information?"; pp. 1-2;, Feb. 15, 2005, PHYSORG.COM, University of Queensland, Australia.

Authers, John, "Is it back to the Fifties?", www.ft.com, Mar. 24, 2009, pp. 1-4, Financial Times, U.K.

Stiglitz, Joseph, "Prize Lecture: information and the change in the paradigm in economics", Dec. 8, 2001, pp. 472-540, The Nobel Foundation, Sweden.

Foundation, The Nobel, Press Release, Oct. 10, 2001, pp. 1-3, The Nobel Foundation Sweden.

Douglas, Niall; "In the light of current evidence, critically examine the efficient market hypothesis", Apr. 10, 2007, pp. 1-7, St. Andrews University, Scotland.

Somoye, Russell; Akintoye, Ishola; Oseni, Jimoh; "Asset pricing in an informational inefficient market"; Dec. 2008, pp. 7-15, European Journal of Economics, Finance and Administrative Science, Eurojournals, Cyprus.

Beechey, Merideth; Gruen, David; Vickery, James, "The efficient market hypothesis: a survey", Jan. 2000, pp. 1-30, Reserve Bank of Australia, Australia.

Luehrman, Timothy; "What's it worth", May-Jun. 1997, pp. 132-142, Harvard Business Review, U.S.A.

Damodaran, Aswath, "The adjusted present value approach", Dec. 4, 2003, pp. 1-4, Stern School of Business, N.Y.U., U.S.A.

Fernandez, Pablo, "Valuing companies by cash flow discounting", Oct. 16, 2008, pp. 1-19, University of Navarra, Spain.

Rigdon, Ed, "Not positive definite matrices, causes and cures", Georgia State University web site, pp. 1-6, Jun. 11, 1997, USA.

Science News Letter, The, "Unlearning is problem", The Science News Letter, Feb. 4, 1956, p. 67, vol. 69, Society for Science & the Public, USA.

Barkoulas, John & Baum, Christopher, "Long term dependence in stock returns", Jan. 1, 1996, pp. 1-12, Boston College, U.S.A.

Botknowledge, "Botknowledge—Frequently Asked Questions", 2000, pp. 1-3, www.botknowledge.com, U.S.A.

Boehm, Barry et al, "Next-Generation software processes and their environment support", 1993, pp. 1-24, University Southern California, U.S.A.

Lyons, Kevin et al, "Product Realization Process Modeling", Jun. 1995, pp. 1-47, National Institute of Standards and Technology, Gaithersburg, MD, USA.

Scacchi, Walt et al, "Modeling, Integrating, and Enacting Complex Organizational Processes", 1998 pp. 153-168, Simulating Organizations, MIT Press, USA.

ANSWER.COM, "Petri Net", Feb. 24, 2010, pp. 1-7, Answers.com, USA.

Wikipedia, "Petri Net", Feb. 17, 2010, pp. 1-11, Wikipedia.org, USA.

Rauenzahn, Rick, "Declaration under Rule 132 for U.S. Appl. No. 10/012,375", Mar. 10, 2010, pp. 1-6, USA.

Caouette, John, Altman, Edward & Narayanan, Paul, Managing Credit Risk, 1998, John Wiley and Sons.

Lohr, Steve, "Gates tries to inspire future techies", International Herald Tribune, Mar. 2, 2004.

Anonymous, "Survey: Too Clever by Half", The Economist, Jan. 24, 2004.

Koller, Timothy, "What is value based management", McKinsey Quarterly, 1994, No. 3.

Brown, Carol; Coakley, James; Phillips Mary Ellen, Neural Networks Enter World of Mgmt Accounting.

Bielinski, Daniel, "How to sort out the premium drivers of post deal value", Mergers & Acquisitions.

Bergstrom, Peter; Kimber Eliot, "Formal data models for SGML and HyTime", SGML, Mar. 1999. electrum.

Harold, Elliotte, XML Bible, IDG Books. 1999.

Knight, James, Value Based Management, McGraw Hill, 1998.

NeuroSolutions, Application Summaries.

* cited by examiner

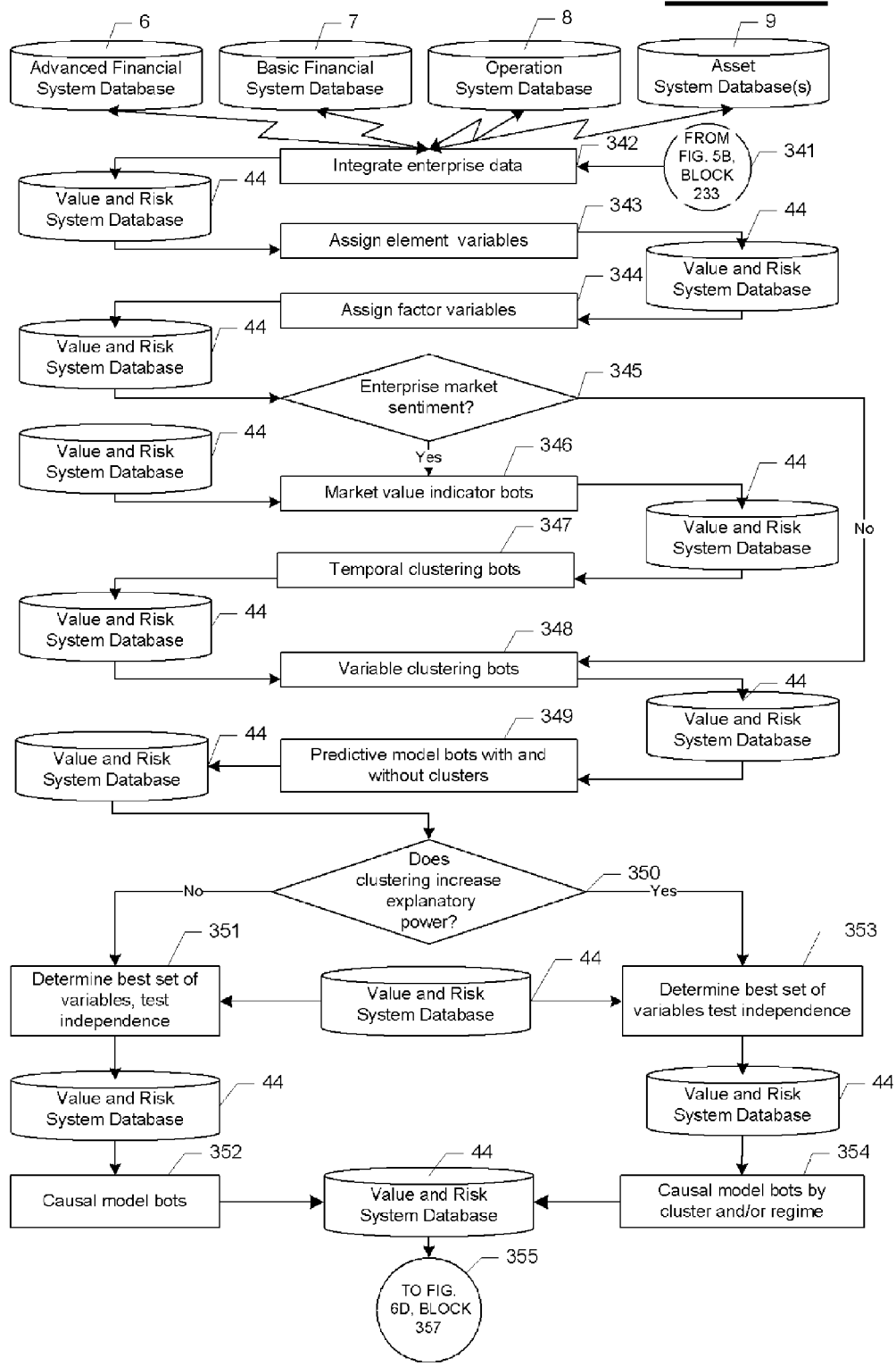

FIG. 7

Enterprise Value Matrix

| | Current Operation | Net Real Options | Market Sentiment | Excess Financial Assets | Derivatives |
|---|---|---|---|---|---|
| Customer element | X | X | X | | |
| Supplier element | X | X | X | | |
| through | | | | | |
| Element of value n | | | | | |
| | | | | | |
| External factor 1 | | | | | |
| through | | | | | |
| External factor n | | | | | |

Enterprise Risk Matrix

| | Current Operation | Net Real Options | Market Sentiment | Excess Financial Assets | Derivatives |
|---|---|---|---|---|---|
| Customer element | X | X | X | | |
| Supplier element | X | X | X | | |
| through | | | | | |
| Element of value n | | | | | |
| | | | | | |
| | | | | | |
| Event Risk | X | X | X | | |
| External factor 1 | | | | | |
| through | | | | | |
| External factor n | | | | | |

Key:
"x" = indicates impact in the value matrix or risk matrix cell

PURCHASING OPTIMIZATION SYSTEM

CROSS REFERENCE TO RELATED APPLICATIONS AND PATENTS

The subject matter of this application is related to the subject matter of U.S. patent application Ser. No. 09/295,337 filed Apr. 21, 1999 (now abandoned), 09/421,553 filed Oct. 20, 1999 (now abandoned), 09/775,561 filed Feb. 5, 2001 (now abandoned), application Ser. No. 09/678,019 filed Oct. 4, 2000, application Ser. No. 09/938,555 filed Aug. 27, 2001 (now abandoned), application Ser. No. 09/994,720 filed Nov. 28, 2001, application Ser. No. 09/994,739 filed Nov. 28, 2001, application number 10/046,316 filed Jan. 16, 2002, application Ser. No. 10/012,375 filed Dec. 12, 2001, application Ser. No. 10/025,794 filed Dec. 26, 2001, application Ser. No. 10/036,522 filed Jan. 7, 2002, U.S. Pat. No. 5,615,109 "Method of and System for Generating Feasible, Profit Maximizing Requisition Sets and U.S. Pat. No. 6,321,205 "Method of and System for Modeling and Analyzing Business Improvement Programs" by Jeff S. Eder, the disclosures of which are incorporated herein by reference.

BACKGROUND OF THE INVENTION

This invention relates to a computer based method of and system for optimizing purchasing activity in a manner that maximizes expected returns while minimizing risk for the enterprise or multi-enterprise organization that is the buyer.

The spectacular splash caused by the Enron bankruptcy has made the public aware of something that professionals have known for a long time—the general ledger does not capture many of the factors that are relevant to accurately assessing corporate financial performance. In fact, the Enron bankruptcy was just the tip of the iceberg as a major financial news publication recently reported that "an examination of the 673 largest bankruptcies of public corporations since 1996 shows that in 54% of cases, no warnings were issued in the audit reports". By now, the deficiencies in the general ledger system which include a failure to include intangible assets; a failure to include real option values; a failure to include data about most risks; and a failure to include data about the impact of most external factors are well known by most investors.

Unfortunately, the deficiencies in the general ledger have been replicated by all known systems for financial management, operations management, risk management and purchasing. These "narrow systems" are nominally supposed to help a business "manage" a subset of its operation. The specific deficiencies in narrow systems include:

1) failure to analyze the impact of change in the narrow part of the operation being analyzed/managed on related parts of the operation;
2) failure to consider soft (aka intangible) assets—this is closely related to the first deficiency because soft assets are generally more inter-related than many hard assets;
3) failure to analyze the impact of change on more than segment of value—most systems only focus on the current operation, the segments of value analyzed by the invention described herein are shown in the table below:

| Segment of enterprise value | Valuation methodology |
| --- | --- |
| Current-operation value (COPTOT) - value of operation that is developing, making, supplying and selling products and/or services | Income valuation |
| Excess net financial assets (aka Excess financial assets) | Total Net Financial Assets valued using GAAP - (amount required to support current operation) |
| Real Options & Contingent Liabilities (aka Real options) | Real option algorithms and optional allocation of industry options |
| Derivatives - includes all hedges, swaps, swaptions, options and warrants | Risk Neutral Valuation |
| Market Sentiment | Market Value* - (COPTOT + Σ Real Option Values + Σ Derivatives + Σ Excess Financial Assets) |

*The user also has the option of specifying the total value;

4) failure to analyze the impact of all relevant external factors on changes being suggested—many assume they can not be managed which is often not the case;
5) failure to analyze the impact of change on enterprise risk—most systems "handle risk" by adjusting the discount rate rather than analyzing the impact on all classes of enterprise risk as a result, actions that reduce enterprise risk can be ignored as they do not impact the valuation placed on the activity which reduces risk; and
6) a focus on "efficiency" rather than value impact; and
7) the use of outdated value metrics.

Taken together these limitations severely restrict the usefulness of the analyses and management direction provided by these narrow systems.

The seven limitations represent two general types of shortcomings in narrow systems. The first five shortcomings can be summarized in to a general statement that narrow systems do not have the contextual background they need for analyzing and managing the part of the enterprise they are designed to support. The implicit assumption in these systems is that the portion of the enterprise they are supporting is independent from the rest of the enterprise and the external environment. Because this is almost never true, narrow systems are generally operating in a manner that is out of touch with reality. Changing even the narrowest slice of the enterprise will generally have an impact on other tangible assets, other intangible assets, other segments of value and enterprise risk. Ignoring these impacts severely diminishes the value of the analysis and recommendations provided by narrow systems. Ignoring these impacts is the equivalent of a doctor providing a drug to optimize kidney performance without considering the impact on other organs and the overall health of the patient. The good news is the kidney is working great, the bad news is the patient died. Perhaps this is the underlying reason that some studies suggest American industry has wasted over $400 Billion on management systems that are not providing any payback.

At this point it is important to distinguish the strategic business context described above with the "administrative context" that is starting to appear in offerings from narrow system vendors. Some are using portals and similar applications to aggregate and display information from different systems to give the users a more complete background or context in which to make their decisions. The implicit message in these systems is "we think this other information might be relevant to your decision but we don't know how important it is so we will display it and let you figure it out".

A system that was able to sort through the different systems and consistently define the proper context for decision making would obviously be an enormous improvement. Other narrow system vendors are more focused on completing transactions in an automated fashion. Doing this requires among other things: the detailed procedure for completing the transaction (i.e. where the money goes, how soon it has to be paid, etc.), the details of the specific transaction—how much of which product should ship, etc. and recent transaction history. Unlike the strategic context information which has not been available from any system before the development of the methods and systems described in the cross-referenced patent applications, the administrative context information is readily available and the major reason for aggregating it in a server or layer is to speed processing rather than provide any new capabilities. Indeed, in the cross-referenced patent applications the readily available administrative context information is included with technical information, market information and the strategic business context information in the layers propagated by the systems described therein.

The second general type of shortcoming of narrow systems is a product of the final two limitations listed above. These limitations can be summarized as a reliance on metrics instead of direct measures of market requirements for value creation. The goal of all narrow applications is to improve market value for the firms that use them. Because of limitations in data availability, a historical shortage of processing power and the lack of robust models for the full spectrum of value creation in the modern enterprise, metrics such as accounting profit, EVA®, the Balanced Scorecard and CFROI® have been developed to give managers a shorthand method for evaluating the "value impact" of their decisions. Unfortunately, these metrics have an uncertain and highly variable relationship with actual market performance. For example, the value relevance of "accounting profit" has been declining steadily for 30 years. The declining relevance of accounting profits has a negative impact on other metrics which are generally some variant of accounting profit. Fortunately, the advances in data availability, processing power and the robust systems and methods for evaluating the full spectrum of value creation detailed in the cross-referenced patent applications enables the direct measurement of the requirements for market value creation. This eliminates the need for metrics which may or may not relate to market value creation.

The "efficient frontier" for each enterprise (as detailed in the cross-referenced patent application Ser. Nos. 09/994,720, 091994,739, 10,046,316 and 10/124,240) provides a concise way to overcome the seven specific shortcomings of existing narrow systems. A change that moves the company closer to its efficient frontier (when the frontier is defined using the methods and systems detailed in the cross-referenced application Ser. Nos. 09/994,720, 09/994,739, 10/046,316 and 10/124,240) would be one that on balance provided a benefit to the organization when all the relevant context and market requirements are properly considered in the analysis.

All known purchasing systems suffer from the limitations described above. In many cases these shortcomings are compounded by the fact that these systems also lack the ability to properly analyze the volume purchase discounts many suppliers offer. Because the great bulk of the cost of many manufactured items consists of purchased parts, the absence of a system that can effectively analyze the offerings from different vendors is a major problem for most companies. The severity of this problem has been exacerbated recently as firms seek ways to more effectively collaborate with their "partners" and suppliers rather than just simply complete spot transactions. One manifestation of this increased collaboration has been a willingness to share the risks as well as the rewards associated with new endeavors. Management systems that bury risk measures in the discount rate are obviously of little help when determining the best way to share risks.

In light of the preceding discussion, it is clear that it would be desirable to provide purchasing managers with the ability to optimize purchasing activity after considering the relevant context factors, market value factors and volume purchase discount schedules. Ideally, this system would be capable of optimizing purchasing activity for companies that are closely collaborating with their suppliers.

SUMMARY OF THE INVENTION

It is a general object of the present invention to provide a novel and useful system that optimizes purchasing activity in a way that maximize expected value while minimizing risk for the enterprise or multi-enterprise organization that is the buyer. This new system overcomes the limitations and drawbacks of the prior art that were described previously. The system of the present invention is the first known system with the ability to optimize purchasing activity from the perspective of an enterprise, a multi-enterprise organization and/or a collaborative multi-enterprise operation. The collaborative multi-enterprise operation is analyzed using a multi-enterprise organization perspective. These different perspectives will hereinafter be referred to as frames.

Before going further, we need to define the terms: feature, buyer and economic benefit. Features encapsulate all the different options the purchasing manager has for acquiring the materials he is expected to deliver (the deliverables). For example, the purchasing manager could buy a one month supply of item A for a certain price or he could buy a three month supply of item A for a different, presumably lower, price. The purchasing manager may also have the option of substituting item A1 for item A at a different price. For our purposes, the buyer will be the enterprise or multi-enterprise organization that is expected to be the first consumer of the deliverables from the purchasing activity. An economic benefit will be defined as improving the value or reducing the risk associated with one or more cells within the matrix of value and/or the matrix of risk for the buyer. In some cases, the buyer may not be the enterprise or organization operating the purchasing system. It should also be noted at this point that the system of the present invention can be used to optimize purchasing activity from other frames in addition to the frames described previously.

Analyzing and optimizing purchasing activity from the buyer's frame requires a complete understanding of the strategic business context and the market requirements for the buyer. A purchasing optimization analysis that incorporates the context and market information required for meaningful analysis can be completed using three different approaches.

The first approach for completing the optimization analyses involves mapping the purchasing activity and suppliers to the buyer's Value and Risk System where the optimal mix of features for purchasing activity—and all other activities—can be determined. The mapping occurs in two steps. The first step requires mapping the suppliers and deliverables to cells within the frame being used within the buyer's matrix of value and/or matrix of risk. The first mapping step can be completed by the user (20) or it can be completed in an automated fashion if the data from the purchasing system database (30) is tagged with xsd and/or xml information that identifies the cells where the purchasing activity will have an impact. The second mapping step is generally completed in an automated fashion as the specific value drivers within each cell that would be impacted by the purchasing activity are identified.

The second approach for completing the analyses involves providing the context and market requirement data required for analysis via an operating system, middleware or web services layer. In this mode, the buyer's Value and Risk System propagates a layer containing the required information for each frame being utilized in the analysis. The novel system of the present invention then extracts the required information from the proper frame within the layer and completes the optimization calculations. The optimized feature set is then communicated back to the buyer's Value and Risk System for inclusion in the most current model.

The third approach for completing the optimization is a cross between the first two methods. In this mode, the purchasing activity and suppliers are mapped to the proper frame within the buyer's matrix of value and/or matrix of risk as required to identify the relevant context and market information. The relevant information is then extracted and the optimization calculations are then completed by the purchasing system. The optimized feature set is then communicated back to the buyer's Value and Risk Matrix™ System for inclusion in the most current model.

The same three approaches can be used to complete analyses for asset, process, project and risk management optimizations. For example, cross-referenced application Ser. No. 10/012,375 filed Dec. 12, 2001 describes a project optimization system that uses the third approach described above, cross-referenced application Ser. No. 10/025,794 filed Dec. 26, 2001 describes a process (and asset) optimization system that uses the third approach described above and cross-referenced application Ser. No. 10/036,522 filed Jan. 7, 2002 describes a risk optimization system that uses the third approach described above. While the third approach was the preferred embodiment for those applications, it should be understood that the other two approaches could be used to complete each of the different types of optimization analyses to the same effect. These same three general methods can also be used to enable financial service providers to provide capital, evaluate creditworthiness, transfer risk, evaluate potential transactions (like acquisitions) and price securities for an enterprise or multi-enterprise organization.

In short, the system of the present invention is a specific embodiment of a general method/system for analyzing, managing and optimizing any subset of an enterprise or multi-enterprise organization by using information from the Value and Risk System. The subset can include services provided by external suppliers. The elements of this general method/system are:

1. A method/system for representing the subset of the enterprise including its resources (inputs), deliverables (outputs) and features;
2. A method/system for creating a map between the resources and deliverables of the subset and the specified frame within the Value and Risk System of the enterprise or multi-enterprise organization;
3. A method/system for using the map from the prior step to make the relevant context and market requirement information from the Value and Risk System available for use in analysis; and
4. A method/system for optimizing the features for the subset and frame being analyzed given the resources, deliverables, market requirements and context.

Under this general method/system, the frame is used to define the portion of the overall context and market requirements that are considered in the analysis. This feature of the method/system gives corporations complete control over how their finance and operation management systems analyze their operations. For example, if a corporation decided that it did not want the real option segment of value included in their analyses, then it could define a frame that excluded this segment of value for all analyses. This is in sharp contrast to the existing narrow systems that have the approach they have chosen "hard wired" in to the software.

Another benefit of the approach taken in the system of the present invention is that the automated extraction, aggregation and analysis of data from a variety of existing computer-based systems significantly increases the scale and scope of the analyses that can be completed by users without a significant background in finance. To facilitate its use as a tool for improving the value of purchasing activities, the system of the present invention produces reports in formats that are graphical and highly intuitive. This capability gives purchasing managers the tools they need to dramatically improve the long-term financial performance of the purchasing activity.

BRIEF DESCRIPTION OF DRAWINGS

These and other objects, features and advantages of the present invention will be more readily apparent from the following description of the preferred embodiment of the invention in which:

FIG. 6A, FIG. 6B, FIG. 6C, FIG. 6D, FIG. 6E and FIG. 6F are block diagrams showing the sequence of steps in the present invention that are utilized in creating the information stored in the application database and the value and risk system database;

FIG. 7 is a diagram illustrating how purchasing deliverables are mapped to the matrices of value and risk for the buyer.

DETAILED DESCRIPTION OF THE PREFERRED EMBODIMENT

Figure 1:
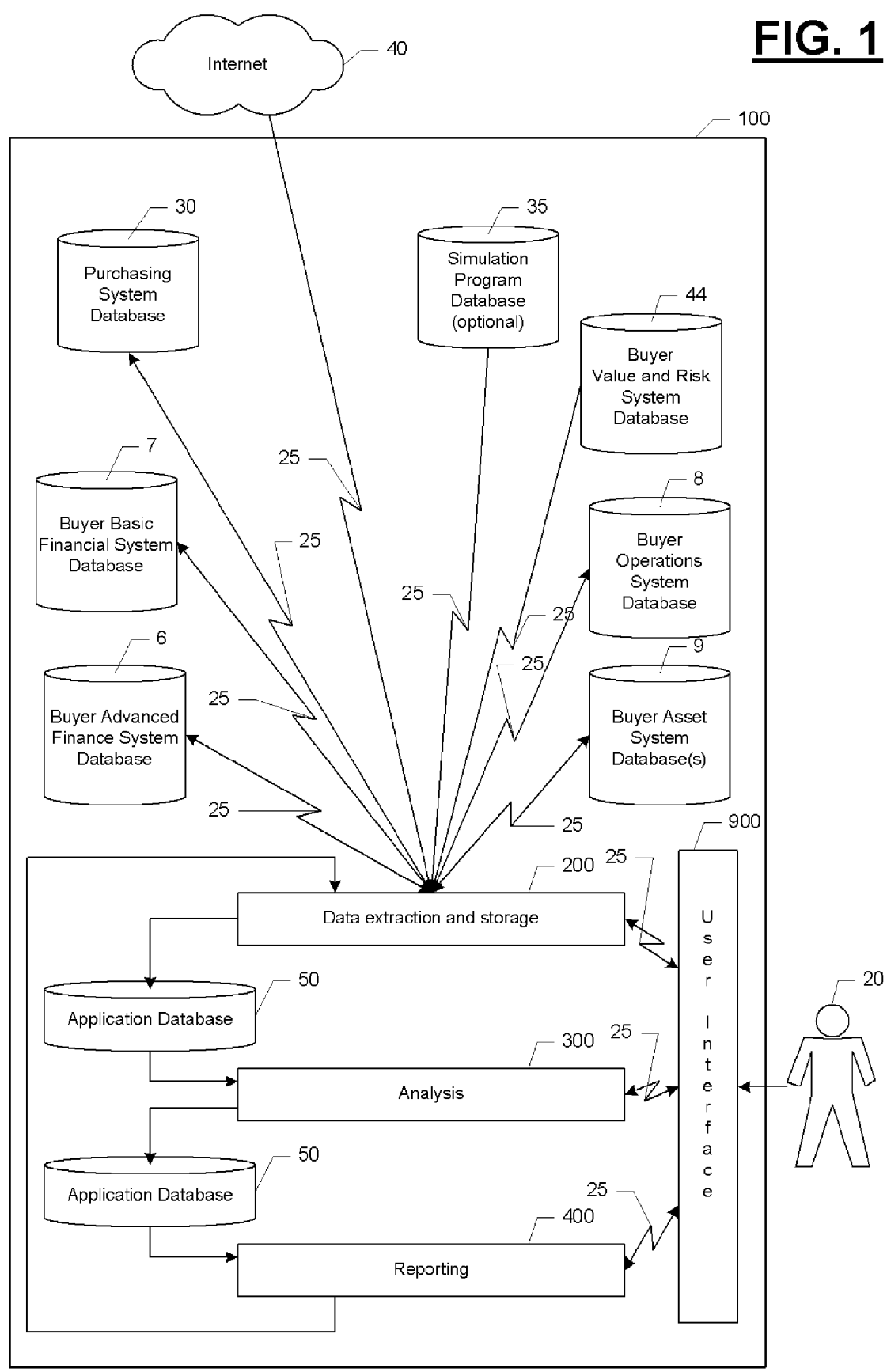
FIG. 1 is a block diagram showing the major processing steps of the present invention.

FIG. 1 provides an overview of the processing completed by the innovative system for purchasing optimization. In accordance with the present invention, an automated method of and system (100) for optimizing the risk and return from purchasing activity is provided. Processing starts in this system (100) with a block of software (200) that extracts, aggregates and stores the data and user input required for completing the analysis. This information is extracted via a network (25) from a purchasing system database (30), optionally, a simulation program database (35), the Internet (40) and a buyer's Value and Risk System database (44). These information extractions and aggregations are guided by a user (20) through interaction with a user-interface portion of the application software (900) that mediates the display and transmission of all information to the user (20) from the system (100) as well as the receipt of information into the system (100) from the user (20) using a variety of data windows tailored to the specific information being requested or displayed in a manner that is well known. While only one database of each type (30, 35 and 44) is shown in FIG. 1, it is to be understood that the system (100) can extract data from multiple databases of each type via the network (25).

Figure 2:
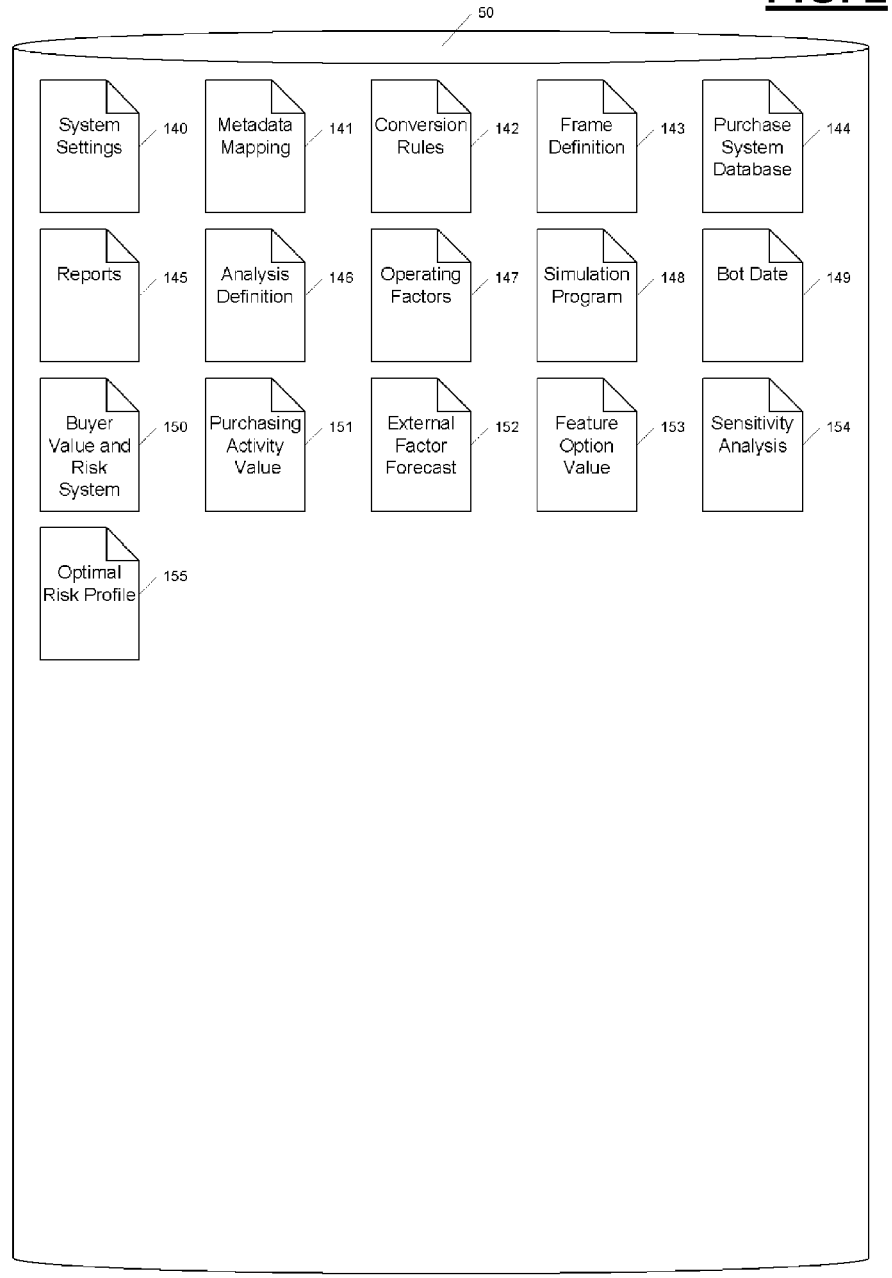
FIG. 2 is a diagram showing the files or tables in the application database (50) of the present invention that are utilized for data storage and retrieval during the processing in the system for optimizing purchasing.

All extracted information concerning the purchasing activity is stored in a file or table (hereinafter, table) within an application database (50) as shown in FIG. 2. The application database (50) contains tables for storing user input, extracted information and system calculations including a system settings table (140), a metadata mapping table (141), a conversion rules table (142), a frame definition table (143), a purchasing system database table (144), a reports table (145), an analysis definition table (146), an operating factors table (147), a simulation program table (148), a bot date table (149), a buyer's Value and Risk System table (150), a purchasing activity value table (151), a external factor forecast table (152), a feature option value table (153), a sensitivity analysis table (154) and an optimal risk profile table (155). The Value and Risk System database (44) contains a cash flow table (156), an advanced finance system table (157), a cluster id table (158), an asset system table (159), a basic financial system table (160), a derivative table (161), an element/external factor definition table (162), an element variables table (163), an enterprise sentiment table (164), an external database table (165), an xml summary table (166), a factor variables table (167), a financial forecast table (168), a generic risk table (169), an industry ranking table (170), an operation systems table (171), an optimal mix table (172), a real option value table (173), a risk reduction activity/product table (174), a scenarios table (175), a segment definition table (176), a simulations table (177), a statistics table (178) and a vector table (179). The application database (50) can optionally exist as a datamart, data warehouse, departmental warehouse, a virtual repository or storage area network. The system of the present invention has the ability to accept and store supplemental or primary data directly from user input, a data warehouse or other electronic files in addition to receiving data from the databases described previously. The system of the present invention also has the ability to complete the necessary calculations without receiving data from one or more of the specified databases. However, in the preferred embodiment, all required information is obtained from the specified databases (30, 35 and 44) and the Internet (40).

Figure 3:
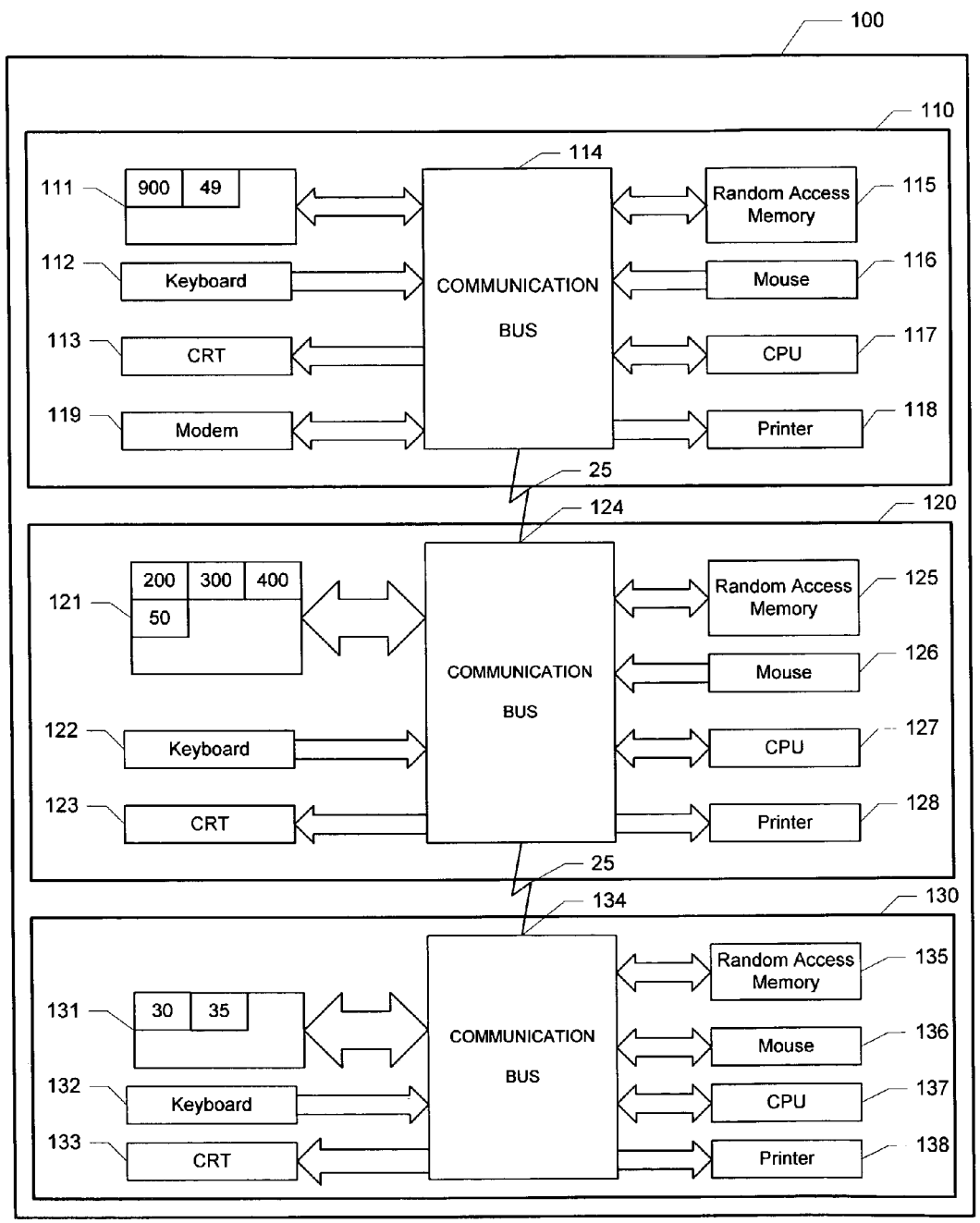
FIG. 3 is a block diagram of an implementation of the present invention.
Figure 4:
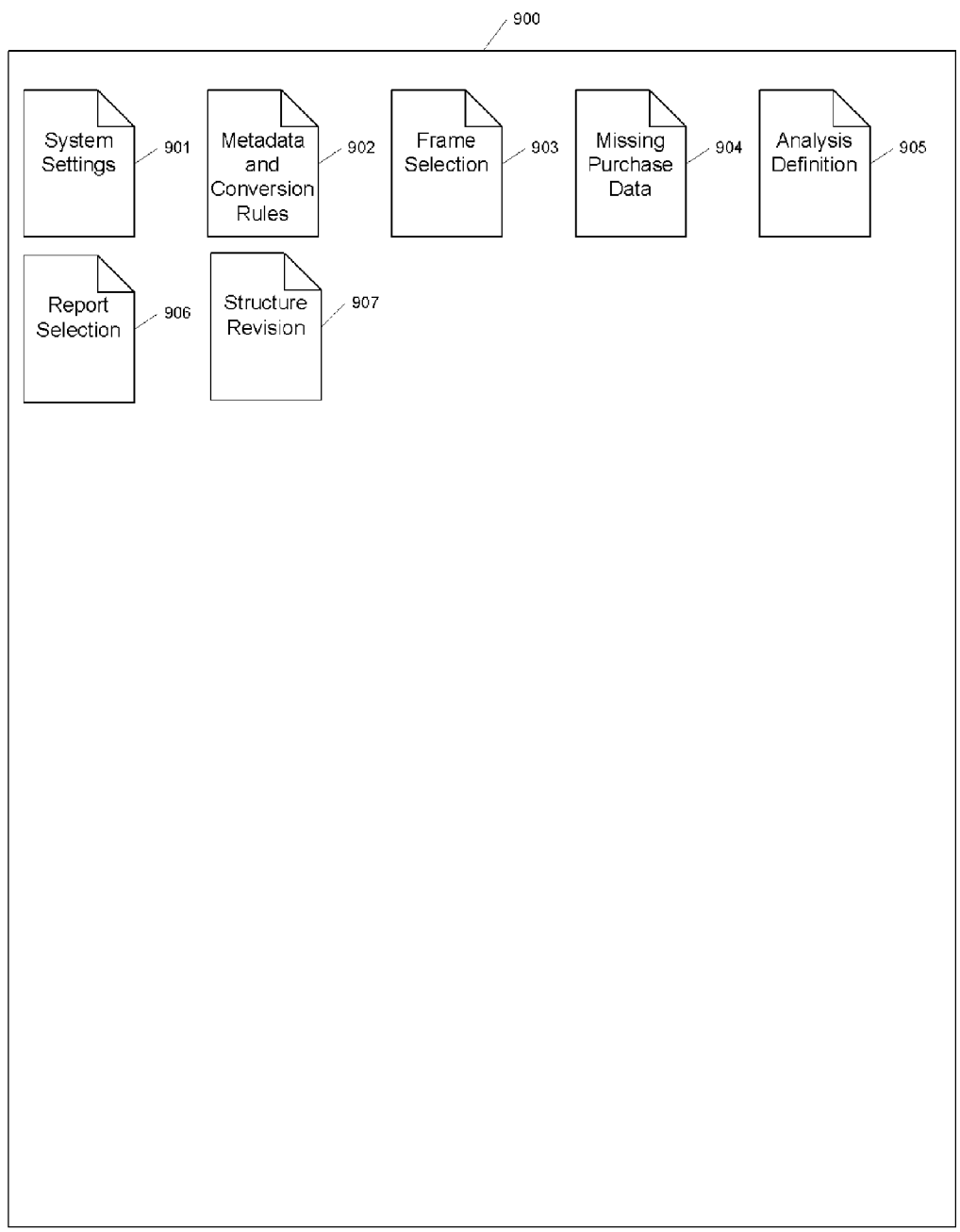
FIG. 4 is a diagram showing the data windows that are used for receiving information from and transmitting information to the user (20) during system processing.

As shown in FIG. 3, the preferred embodiment of the present invention is a computer system (100) illustratively comprised of a client personal computer (110) connected to an application server personal computer (120) via a network (25). The application server personal computer (120) is in turn connected via the network (25) to a database-server personal computer (130).

The database-server personal computer (130) has, a hard drive (131) for storage of the purchasing system database (30), optionally, the simulation program database (35), a keyboard (132), a CRT display (133), a communications bus (134) and a read/write random access memory (135), a mouse (136), a CPU (137), and a printer (138).

The application-server personal computer (120) has a hard drive (121) for storage of the application database (50) and the majority of the application software (200, 300 and 400) of the present invention, a keyboard (122), a CRT display (123), a communications bus (124), a read/write random access memory (125), a mouse (126), a CPU (127), and a printer (128). While only one client personal computer is shown in FIG. 3, it is to be understood that the application-server personal computer (120) can be networked to fifty or more client personal computers (110) via the network (25). The application-server personal computer (120) can also be networked to fifty or more server, personal computers (130) via the network (25). It is to be understood that the diagram of FIG. 3 is merely illustrative of one embodiment of the present invention. For example the system could be housed on one or two computer or it could be distributed to more than 3 computers.

The client personal computer (110) has a hard drive (111) for storage of a client data-base (49) and the user-interface portion of the application software (900), a keyboard (112), a CRT display (113), a communication bus (114), a read/write random access memory (115), a mouse (116), a CPU (117), a printer (118) and a modem (119).

The application software (200, 300 and 400) controls the performance of the central processing unit (127) as it completes the calculations required for purchasing activity optimization. In the embodiment illustrated herein, the application software program (200, 300 and 400) is written in Java. The application software (200, 300 and 400) also uses Structured Query Language (SQL) for extracting data from other databases (30, 35 and 44) and then storing the data in the application database (50) or for receiving input from the user (20) and storing it in the client database (49). The other databases contain purchasing system database (30), simulations of the impact of alternative suppliers and parts (35) and the elements of value, external factors and risks of the buyer (44). The user (20) provides the information to the application software as required to determine which data need to be extracted and transferred from the database-server hard drive (131) via the network (25) to the application-server computer hard drive (121) by interacting with user-interface portion of the application software (900). The extracted information is combined with input received from the keyboard (112) or mouse (116) in response to prompts from the user-interface portion of the application software (900) before processing is completed.

User input is initially saved to the client database (49) before being transmitted to the communication bus (124) and on to the hard drive (121) of the application-server computer via the network (25). Following the program instructions of the application software, the central processing unit (127) accesses the extracted data and user input by retrieving it from the hard drive (121) using the random access memory (125) as computation workspace in a manner that is well known.

The computers (110, 120 and 130) shown in FIG. 3 illustratively are personal computers or any of the more powerful computers or workstations that are widely available. Typical memory configurations for client personal computers (110)

used with the present invention should include at least 128 megabytes of semiconductor random access memory (115) and at least a 2-gigabyte hard drive (111). Typical memory configurations for the application-server personal computer (120) used with the present invention should include at least 256 megabytes of semiconductor random access memory (125) and at least a 250 gigabyte hard drive (121). Typical memory configurations for the database-server personal computer (130) used with the present invention should include at least 1024 megabytes of semiconductor random access memory (135) and at least a 500 gigabyte hard drive (131).

Figure 5A:
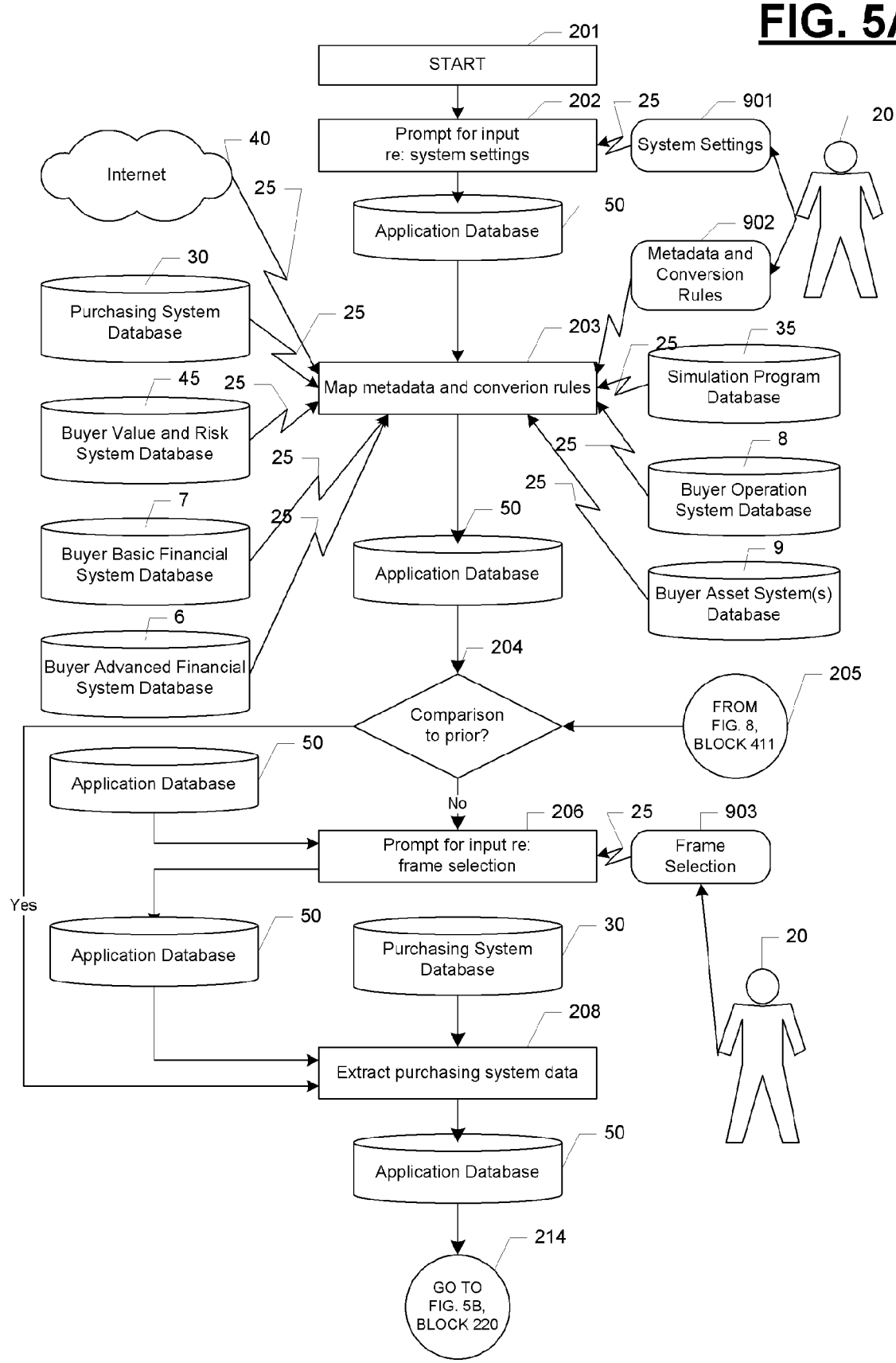
FIG. 5A and FIG. 5B are block diagrams showing the sequence of steps in the present invention used for extracting, aggregating and storing information utilized in system processing from: user input, the purchasing system database, optionally, the simulation program database; the Internet; buyer's basic financial system database, buyer's advanced financial system database, buyer's operation system database, the buyer's asset system(s) database(s) and the buyer's Value and Risk System database.
Figure 5B:
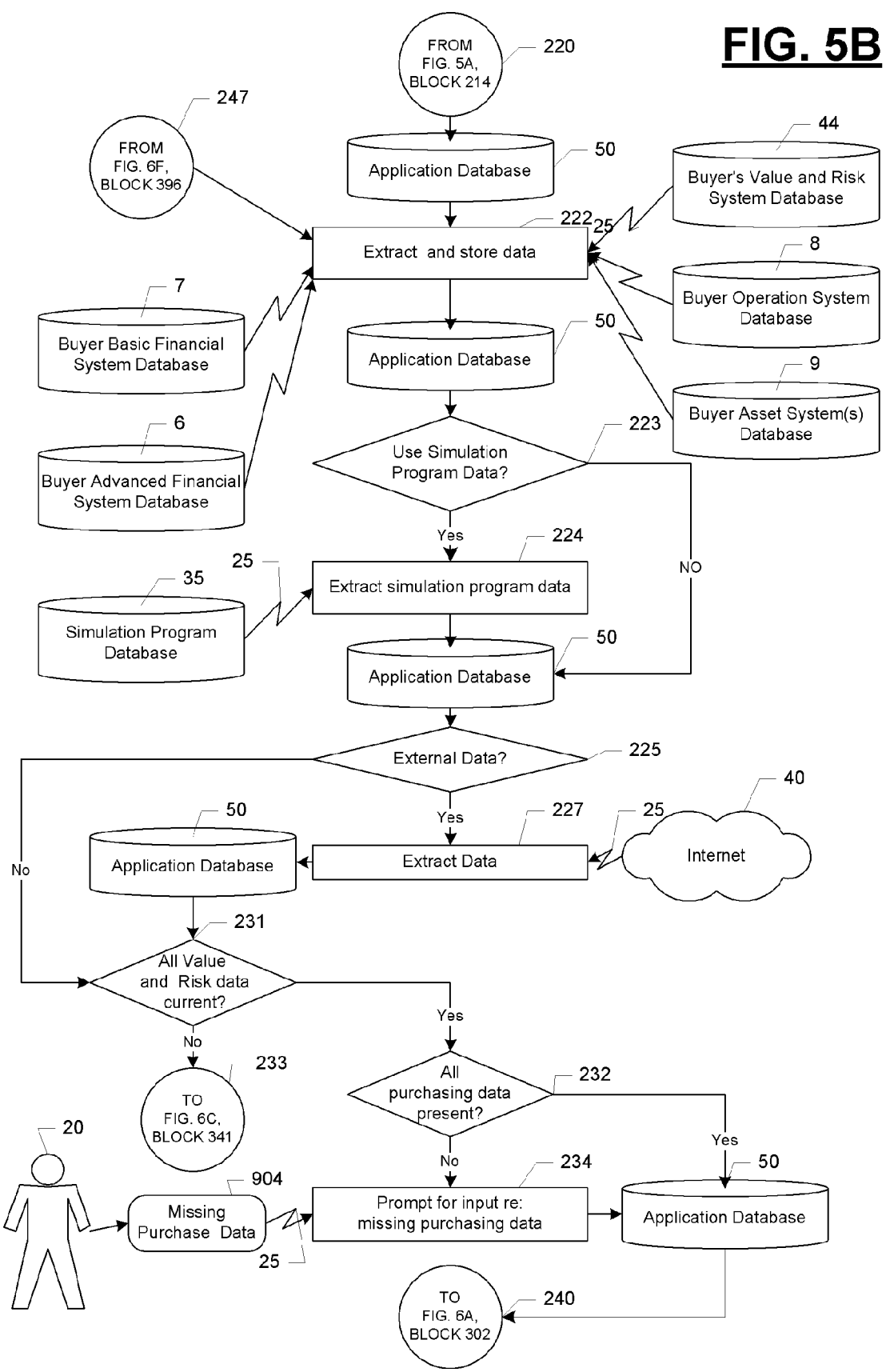
Figure 6A:
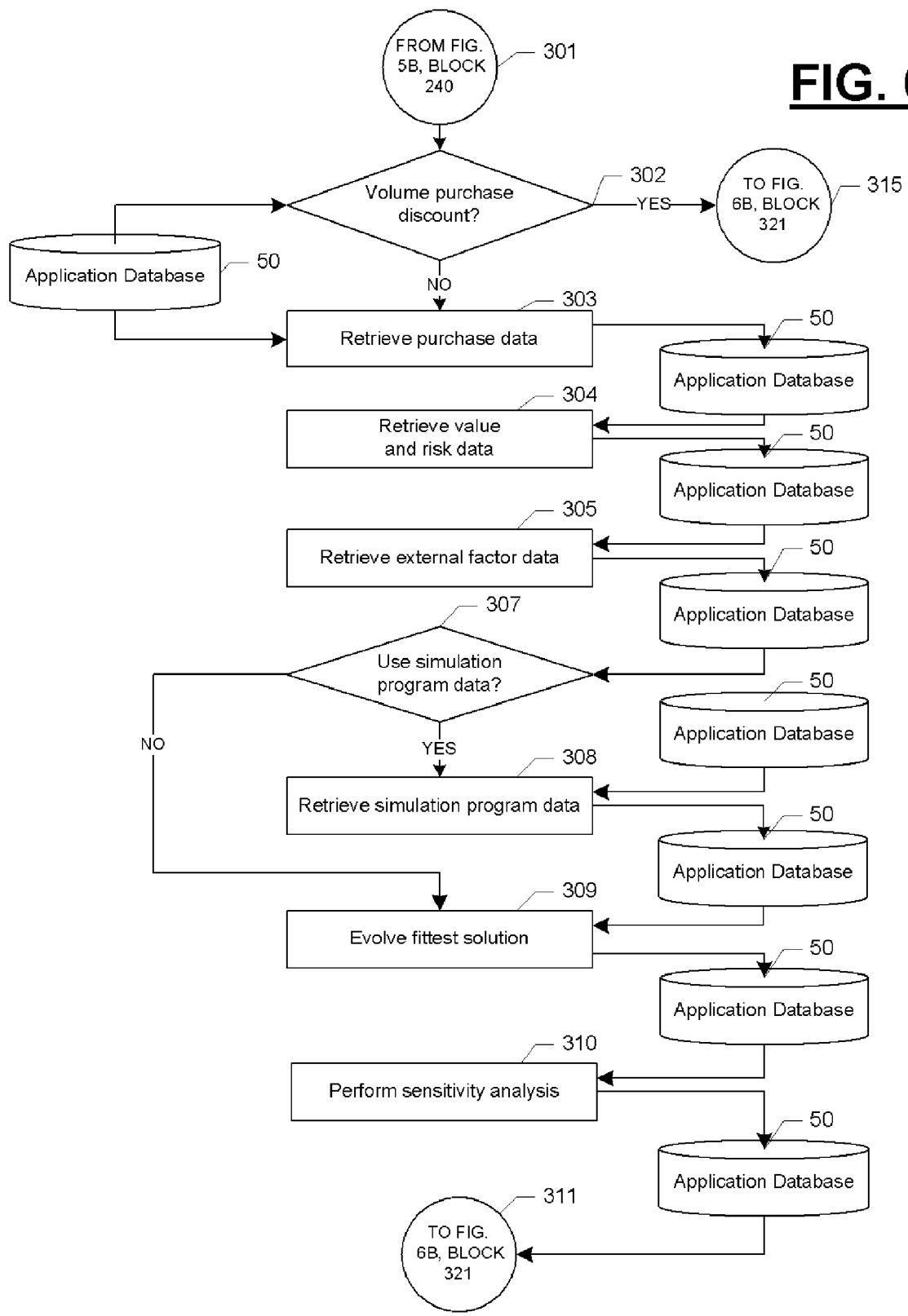
Figure 6B:
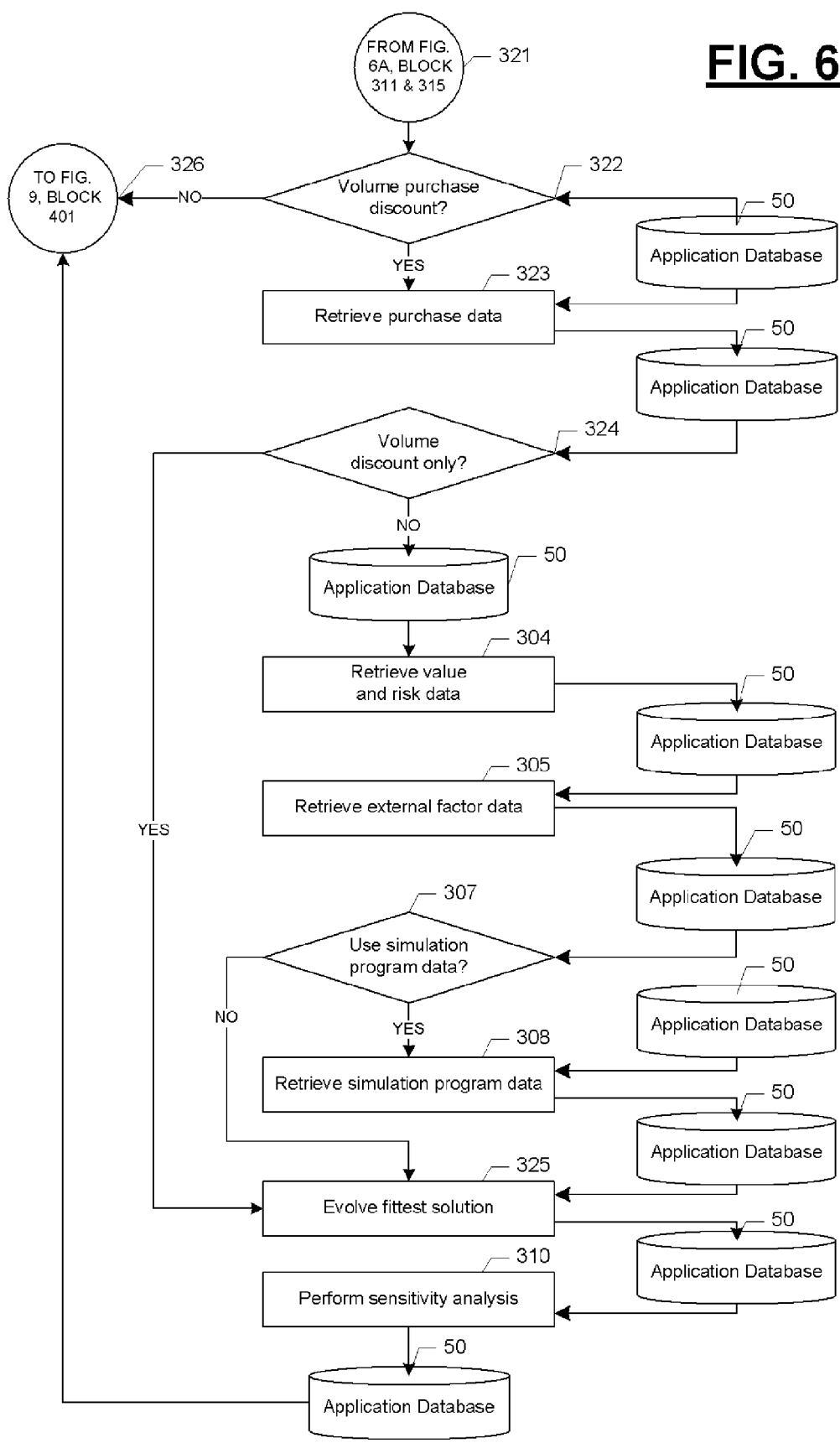
Figure 6D:
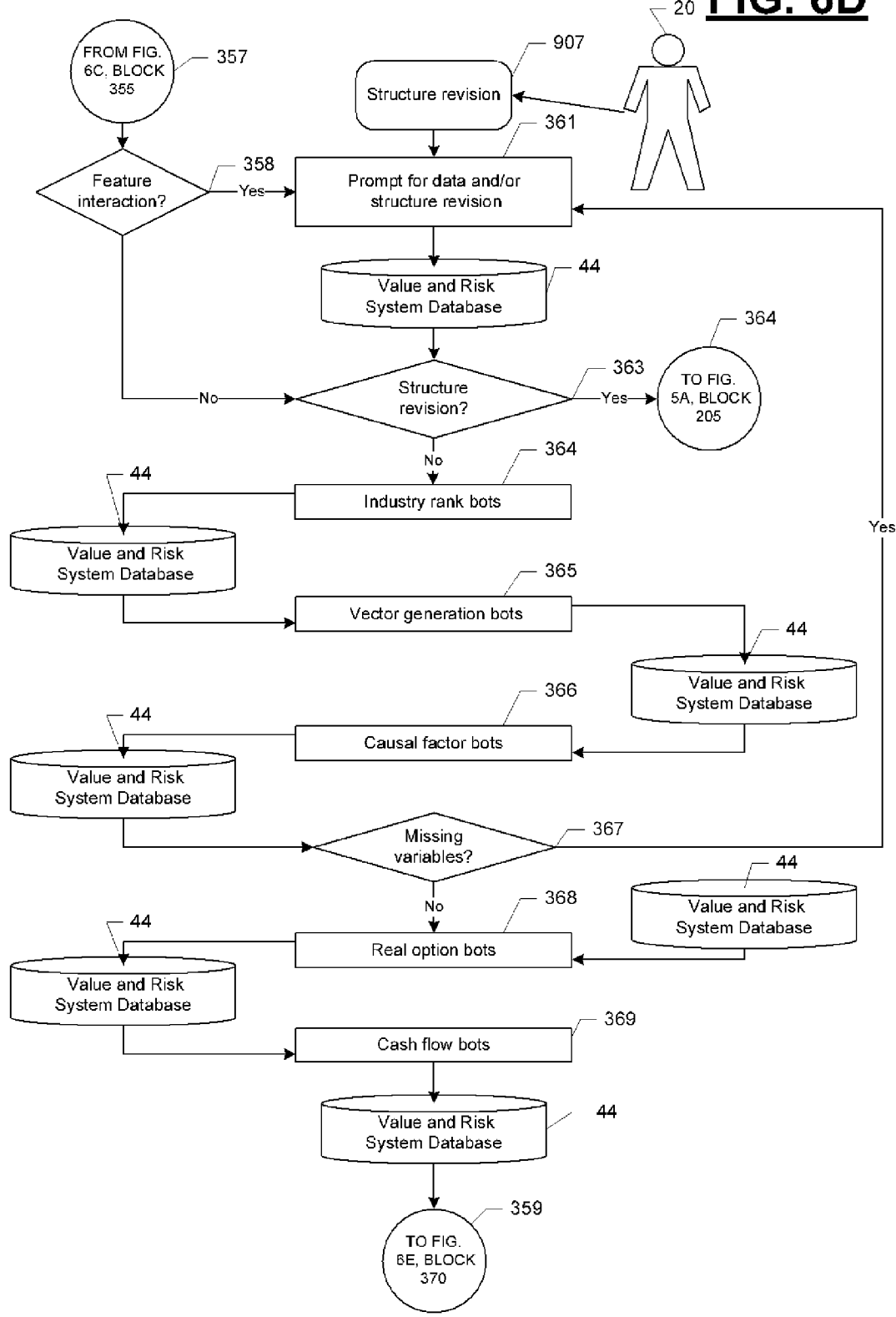
Figure 6E:
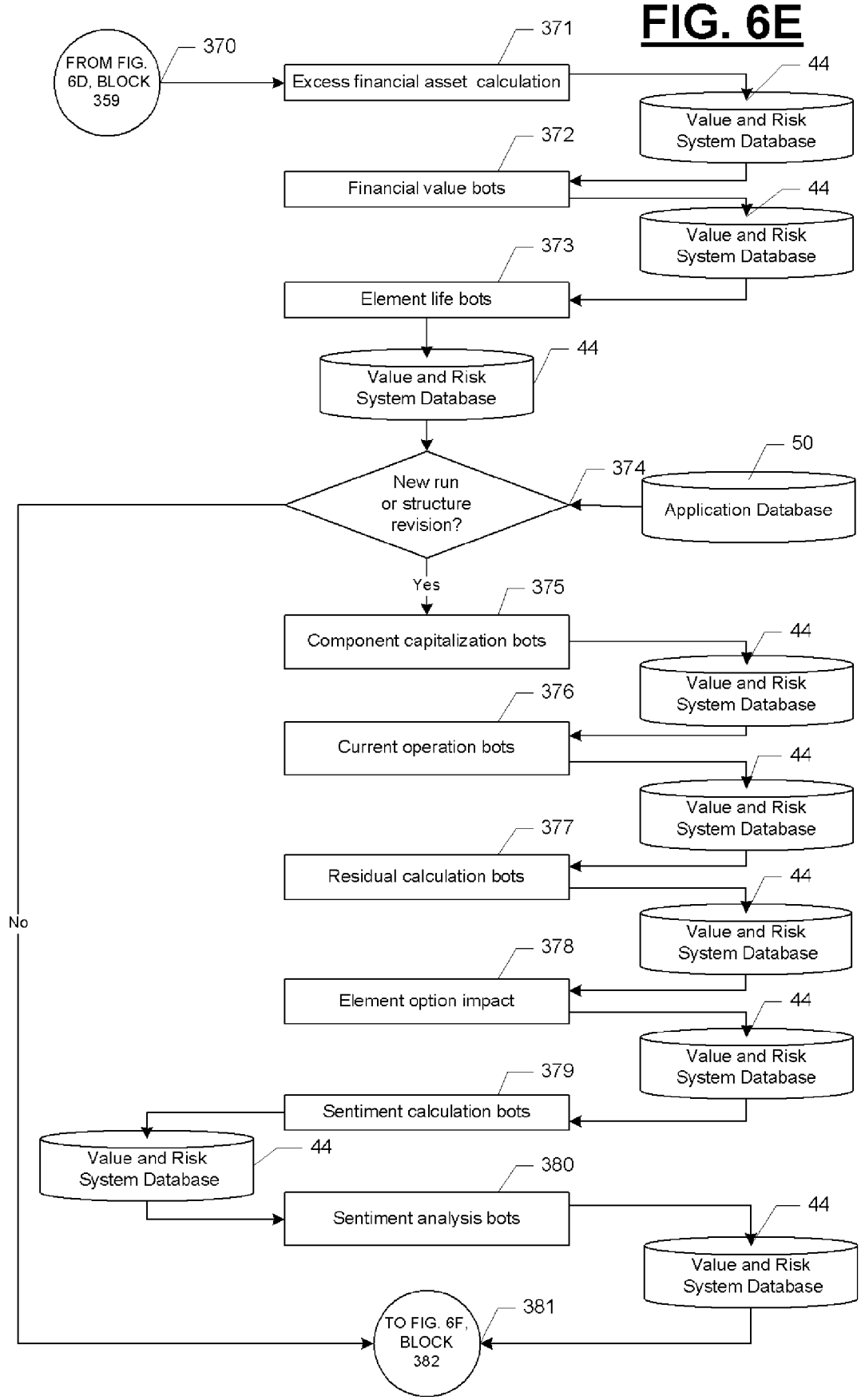
Figure 9:
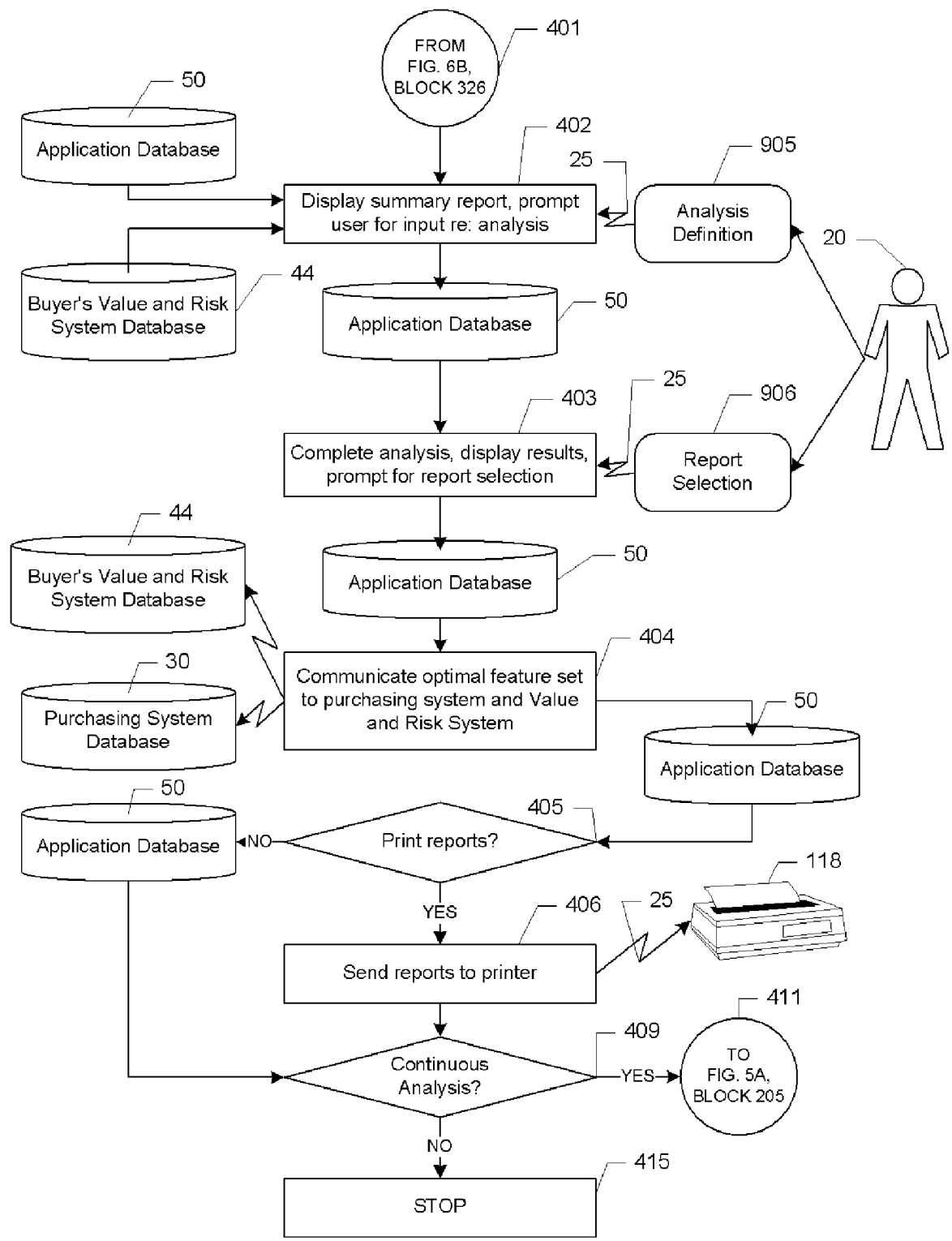
FIG. 9 is a block diagram showing the sequence of steps in the present invention used for completing analyses, communicating purchasing activity to other systems and displaying, selecting and printing management reports.
Figure 10:
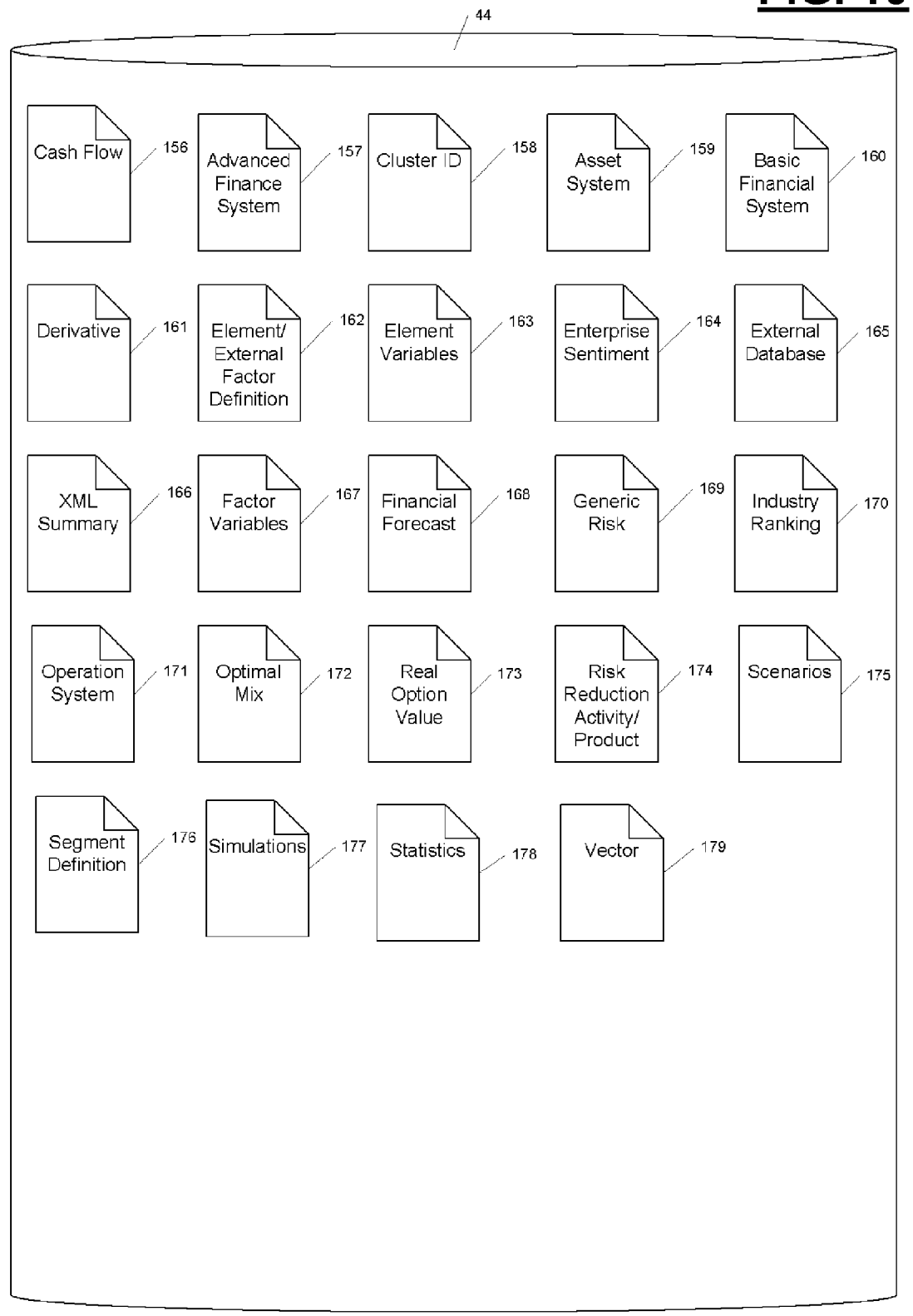
FIG. 10 is a diagram showing the files or tables in the value and risk system database that are utilized for data storage and retrieval during processing.

Using the system described above, the risk and return of the purchasing activity being analyzed will be optimized from the perspective of the buyer. Optimizing the risk and return of a purchasing activity as outlined previously is completed in three distinct stages. The first stage of processing (block 200 from FIG. 1) extracts, aggregates and stores the data from user input, internal databases (30, 35 or 44) and the internet (40) as shown in FIG. 5A and FIG. 5B. The second stage of processing (block 300 from FIG. 1) analyzes the extracted data and determines the mix of purchasing activity features and feature options that maximizes purchasing activity returns while minimizing purchasing activity risk as shown in FIG. 6A and FIG. 6B. The third and final stage of processing (block 400 from FIG. 1) displays the results of the prior calculations, completes special analyses, communicates with other systems and displays detailed graphical reports and optionally prints them as shown in FIG. 9.

Data Extraction and Storage

The flow diagrams in FIG. 5A and FIG. 5B detail the processing that is completed by the portion of the application software (200) that extracts, aggregates and stores the information required for system operation from: a purchasing system database (30), optionally, a simulation program database (35), the Internet (40) and a buyer's Value and Risk System database (44) and the user (20). A brief overview of the different databases will be presented before reviewing each step of processing completed by this portion (200) of the application software.

Purchasing systems typically have the ability to not only track historical transactions but to forecast future performance. For manufacturing firms these systems are used to monitor, coordinate, track and plan the acquisition of materials. These systems will generally maintain detailed records concerning the performance of the different vendors that supply materials to the firm including the information shown in Table 1.

TABLE 1

Purchasing System—Vendor Information

1. Vendor Name
2. Vendor Number
3. Commodity Code(s)
4. Year to date dollar volume
5. Historical dollar volume
6. Percentage of deliveries rejected by QC
7. Percentage of deliveries accepted out of specification
8. Compliance with ISO 9000
9. Actual lead time required for purchases
10. Terms and conditions for purchases
11. Average Delivery Quantity Variance
12. Average Delivery Date Variance
13. EDI* vendor—Yes or No

*EDI = Electronic Data Interchange

These systems also have information about current and planned orders for parts and materials including the information shown in Table 2.

TABLE 2

Purchasing System—Order Information

1. Order Number
2. Vendor Name
3. Vendor Number
4. Commodity Code(s)
5. Part Number
6. Order Quantity
7. Date of Order
8. Order Due Date
9. Order Costs
10. Order Payment Terms
11. Order Shipping Method
12. Volume Purchase Discount—Yes or No Purchasing systems similar to the one described above may also be useful by distributors for use in monitoring the flow of products from a manufacturer. The system of the present invention is capable of processing data related to purchasing activity if it resides in more than one database or is produced by more than one system. The extraction, conversion and storage of the distributed data could be guided by the user (20) during system setting or the system of the present invention could identify the required systems and data in an automated fashion if the proper xsd and xml tagging is in place.

Simulation programs such as MatLab, Simulink, SPICE, etc. can optionally be used to generate performance data for changes in deliverables and suppliers by forecasting product or process performance using a new set of resources and/or features. The information regarding deliverable design and operating performance is combined with external factor price information downloaded from web sites and/or databases on the internet (40) as required to support risk and return management for the purchasing activity being analyzed. The information on external factor prices will include both current prices and future prices.

The buyer's Value and Risk System database (44) for an enterprise contains the matrix of value, matrix of risk, segment of value models and related statistics generated by the system described in the cross referenced patent application Ser. Nos. 09/994,720 dated Nov. 28, 2001, 09/994,739 dated Nov. 28, 2001, 10,046,316 dated Jan. 16, 2002 and 10/124,240 dated Apr. 18, 2002. The matrix of value, matrix of risk, segment of value models and statistics used in processing are continually developed using the method detailed in FIG. 6C, FIG. 6D, FIG. 6E and FIG. 6F.

System processing of the information from the different databases (30, 35 and 44) and the Internet (40) described above starts in a block 201, FIG. 5A, which immediately passes processing to a software block 202. The software in block 202 prompts the user (20) via the system settings data window (901) to provide system settings information. The system settings information entered by the user (20) is transmitted via the network (25) back to the application server (120) where it is stored in the system settings table (140) in the application database (50) in a manner that is well known. The specific inputs the user (20) is asked to provide at this point in processing are shown in Table 3.

TABLE 3

1. Buyer
2. Time period for analysis
3. Mode of operation (continuous or batch)
4. Purchase volume discount analysis (yes, no or exclusive)
5. Metadata standard
6. Location of purchasing system database and metadata (optional)
7. Location of simulation system databases and metadata (optional)
8. Location of external database and metadata (optional)
9. Scenario (combined normal, extreme is default)
10. Location of account structure
11. Base currency
12. Risk free cost of capital
13. Risk adjusted cost of capital
14. Management report types (text, graphic, both)
15. Default reports
16. Default missing data procedure
17. Maximum time to wait for user input
18. Maximum number of generations to process without improving fitness The specification of the location and metadata information for the purchasing system database, simulation database, Buyer basic financial system (7), Buyer advanced financial system (6), Buyer operation system (8), Buyer asset system(s) (9) and external database are optional because that information may have been included in the xsd and/or xml information attached to each system and data element. If this is the case, then the software in this block would be able to locate the required data without the user (20) having to specify its metadata standard and location. The metadata information for the buyers' Value and Risk System database (44) is also provided here. The volume purchase discount schedules, item inventories and item requirements (note "item" and "deliverable" are used interchangeably) are obtained from the purchasing system database (30). In any event, after the storage of system settings data is complete, processing advances to a software block 203.

The software in block 203 prompts the user (20) via the metadata and conversion rules window (902) to map all purchasing resources and deliverables from the purchasing system database (30) all financial data from a buyer basic financial system, buyer advanced financial system, buyer operation system and buyer asset system(s) and optionally, a simulation program database (35) using the metadata standard specified by the user (20) to the buyer's Value and Risk System database (44) which has a standardized format as described in cross-referenced patent application Ser. No. 09/994,739 filed Nov. 28, 2001. The metadata mapping at this stage may take the form of simply confirming the metadata mapping information extracted from the purchasing system database (30). The metadata mapping specifications are saved in the metadata mapping table (141). As part of the metadata mapping process, any purchasing system database fields that are not mapped to the Value and Risk™ System database (44) are defined by the user (20) as non-relevant attributes. This information is also saved in the metadata mapping table (141). After all field maps have been stored in the metadata mapping table (141), the software in block 203 prompts the user (20) via the metadata and conversion rules window (902) to optionally provide conversion rules for each metadata field for each data source. Conversion rules will include information regarding currency conversions and conversion for units of measure that may be required to consistently analyze the data. The inputs from the user (20) regarding conversion rules are stored in the conversion rules table (142) in the application database (50). After conversion rules have been stored for all fields from every data source, then processing advances to a software block 204.

The software in block 204 checks the system settings table (140) in the application database (50) to determine if the current calculation is a new calculation or a comparison to a prior calculation. If the calculation is a comparison to a prior calculation, then processing advances to a software block 208. Alternatively, if the calculation is not a comparison to a prior calculation, then processing advances to a software block 206.

The software in block 206 prompts the user (20) via the frame selection window (903) to select frames for analysis. The frames available for analysis are those defined in the buyer's Value and Risk System (44) and made available to the system of the present invention. The frame selection screen provides a brief description of the frame, the frame time span and the detailed definition of the frame. The user (20) can also define subsets of the available frames for analysis. The specification of selected frames and any newly defined frames are stored in the frame definition table (143) in the application database (50) before processing advances to a software block 208.

The software in block 208 checks the bot date table (149) and deactivates any purchasing system data bots with creation dates before the current system date and retrieves information from the system settings table (140), metadata mapping table (141), the conversion rules table (142) and the frame definition table (143). The software in block 208 then initializes data bots for each field in the metadata mapping table (141) that mapped to the purchasing system database (30). Bots are independent components of the application that have specific tasks to perform. In the case of data acquisition bots, their tasks are to extract and convert data from a specified source and then store it in a specified location. Each data bot initialized by software block 208 will store its data in the purchasing system table (144). Every purchasing system data bot contains the information shown in Table 4.

TABLE 4

1. Unique ID number (based on date, hour, minute, second of creation)
2. The data source location
3. Mapping information
4. Timing of extraction
5. buyer
6. Process
7. Frame
8. Conversion rules (if any)
9. Storage location (to allow for tracking of source and destination events)
10. Creation date (date, hour, minute, second)

After the software in block 208 initializes the bots for every mapped field within the purchasing system database (30) by frame, the bots extract and convert data in accordance with their preprogrammed instructions. After the extracted and converted data is stored in the purchasing system database table (144), processing advances to a software block 222.

The software in block 222 checks the bot date table (149) and deactivates any Value and Risk data bots with creation dates before the current system date and retrieves information from the system settings table (140), metadata mapping table (141), the conversion rules table (142) and the frame definition table (143). The software in block 222 then initializes data bots for retrieving the relevant portion of the buyer's Value and Risk database, buyer's basic financial system database (7), buyer's advanced financial system database (6), buyer's operation system database (8) and buyer's asset system(s) database(s) (9) for each frame. Bots are independent components of the application that have specific tasks to perform. In the case of Value and Risk system, buyer basic financial system, buyer advanced financial system, buyer operation system and buyer asset system(s) data bots, their tasks are to extract and convert data for the specified frame and store the information in a specified location. Each data bot initialized by software block 222 will store its data in the buyer's Value and Risk System table (150), the Advanced Finance System Table (157), the Asset System Table (159), the Basic Finance System Table (160) or the Operation System Table (171). Every buyer Value and Risk data bot contains the information shown in Table 5.

TABLE 5

1. Unique ID number (based on date, hour, minute, second of creation)
2. Mapping information
3. Timing of extraction
4. Buyer
5. Frame
6. Conversion rules (if any)
7. Storage location (to allow for tracking of source and destination events)
8. Creation date (date, hour, minute, second)

After the software in block 222 initializes the bots they extract and convert data in accordance with their preprogrammed instructions by frame. After the extracted and converted data is stored, processing advances to a software block 223.

The software in block 223 checks the system settings table (140) to determine if simulation program data is being used in the purchasing activity analysis. If simulation program data are being used, then processing advances to a software block 224. Alternatively, if simulation program data are not being used, then processing advances to a software block 225.

The software in block 224 checks the bot date table (149) and deactivates any simulation program data bots with creation dates before the current system date and retrieves information from the system settings table (140), metadata mapping table (141), the conversion rules table (142) and the frame definition table (143). The software in block 224 then initializes data bots by frame for each field in the metadata mapping table (141) that mapped to a field in the simulation programs database (35). Bots are independent components of the application that have specific tasks to perform. In the case of data bots, their tasks are to extract and convert data from a specified source and then store it in a specified location. Each data bot initialized by software block 224 will store its data in the simulation programs table (148). Every simulation program data bot contains the information shown in Table 6.

TABLE 6

1. Unique ID number (based on date, hour, minute, second of creation)
2. The data source location
3. Mapping information
4. Timing of extraction
5. Buyer
6. Frame
7. Simulation resource and/or deliverable
8. Conversion rules (if any)
9. Storage location (to allow for tracking of source and destination events)
10. Creation date (date, hour, minute, second)

After the software in block 224 initializes the bots for every mapped result within the simulation programs database (35) by frame, the bots extract and convert data in accordance with their preprogrammed instructions. After the extracted and converted data is stored in the simulation program table (148), processing advances to a software block 225.

The software in block 225 checks the system settings table (140) to determine if any data from external databases is being used in the purchasing activity analysis. If data from external databases are being used, then processing advances to a software block 227. Alternatively, if simulation program data are not being used, then processing advances to a software block 231.

The software in block 227 checks the bot date table (149) and deactivates any external factor price data bots with creation dates before the current system date and retrieves information from the system settings table (140), metadata mapping table (141), the conversion rules table (142) and the frame definition table (143). The software in block 227 then initializes data bots by external factor for each field in the metadata mapping table (141) that mapped to an external factor price on the Internet (40). Bots are independent components of the application that have specific tasks to perform. In the case of data bots, their tasks are to extract and convert data from a specified source for the time period and then store it in a specified location. Each data bot initialized by software block 227 will store the data it retrieves in the external factor forecast table (152). Every external factor price data bot contains the information shown in Table 7.

TABLE 7

1. Unique ID number (based on date, hour, minute, second of creation)
2. The data source location
3. Mapping information
4. Timing of extraction
5. Buyer
6. Frame
7. External factor
8. Time period(s)
9. Conversion rules (if any)
10. Storage location (to allow for tracking of source and destination events)
11. Creation date (date, hour, minute, second)

After the software in block 227 initializes the bots for every mapped external factor on the Internet (40), the bots extract and convert data in accordance with their pre-programmed instructions. After the extracted and converted data is stored in the external factor forecast table (152), processing advances to a software block 231. The software in block 231 checks to see if the data in the Value and Risk system table (150) are current. If the data are not current, then processing advances to a software block 342. If the data are current, then processing advances to a software block 232.

The software in block 232 compares the data in the purchasing system database table (144), the simulation program table (148), the buyer's Value and Risk system table (150), basic financial system database (7), advanced financial system database (6), operation system database (8) and asset system(s) database(s) (9) and the external factor forecast table (152) to determine if there any periods where required data is missing. If data is missing, then processing advances to a software block 234. Alternatively, if the required data is present for every time period, then processing advances to a software block 302.

The software in block 234 prompts the user (20) via the missing purchase data window (904) to input the missing data displayed on the window. The new information supplied by the user (20) is stored in the appropriate table before processing advances to software block 302.

Analysis

The flow diagrams in FIG. 6A and FIG. 6B detail the processing that is completed by the portion of the application software (300) that determines the mix of purchasing features and options that maximize value while minimizing risk for the buyer and for other specified frames. This portion of the application software (300) also evaluates the sensitivity of the optimal solution to changing external factor and/or feature prices. The data being analyzed is normalized before processing begins.

Processing in this portion of the application begins in software block 302. The software in block 302 checks the system settings table (140) in the application database (50) to determine if the current calculation includes volume purchase discounts. If the purchasing activity that is being optimized includes volume purchase discounts, then processing advances to a software block 352 322. Alternatively, if the purchasing activity does not include volume purchase discounts, then processing advances to a software block 303.

The software in block 303 identifies the frames being analyzed using data from the frame definition table (143) and then uses the information from the metadata mapping table (141) to identify the purchasing activity data that needs to be retrieved from the purchasing system database table (144) for the frames being analyzed. After retrieving the required purchasing data which includes the deliverable requirements for the time period, the current orders, items (deliverables) by supplier, resources and pricing information, processing advances to a software block 304. The software in block 304 retrieves the metadata mapping table (141) data as required to identify and retrieve Value and Risk data regarding the specific value drivers that are linked to purchased resources, deliverables and features for the selected frames before processing advances to a software block 305. The software in block 305 retrieves the external factor prices for the purchasing activity being analyzed from the external factor forecast table (152) before processing advances to a software block 307.

The software in block 307 checks the system settings table (140) to determine if simulation program data is being used in the purchasing activity analysis. If simulation program data is being used, then processing advances to a software block 308. Alternatively, if simulation program data is not being used, then processing advances to a software block 309. The software in block 308 retrieves the feature, resource and deliverable data for the purchasing activity being analyzed from the simulation program table (148) before processing advances to software block 309.

The software in block 309 checks the bot date table (149) and deactivates any optimization bots with creation dates before the current system date and uses the previously retrieved information (from the system settings table (140), metadata mapping table (141), the conversion rules table (142), the frame definition table (143), the purchasing system database table (144), optionally, the simulation program table (148), the buyer's Value and Risk System table (150) and the external factor forecast table (152). Bots are independent components of the application that have specific tasks to perform. In the case of optimization bots, their primary task is to determine the optimal mix of purchasing activity features by frame. The optimal mix is the mix that maximizes value and minimizes risk for the frame being analyzed. The optimization bots run simulations of purchasing activity, buyer risk and buyer return within the relevant portions of the matrix of value and/or the matrix of risk using a non-linear, mixed integer optimization algorithm for each frame. Other optimization algorithms such as a genetic algorithm can be used to the same effect. Every optimization bot activated in this block contains the information shown in Table 8.

TABLE 8

1. Unique ID number (based on date, hour, minute, second of creation)
2. Creation date (date, hour, minute, second)
3. Mapping information
4. Storage location
5. Buyer
6. Type: non-linear—mixed integer or genetic algorithm
7. Frame After the optimization bots are initialized, the bots activate in accordance with their preprogrammed instructions. After being activated, the bots determine the mix of features options that optimize the purchasing activity for each frame. The optimal mix is saved in the purchasing activity value table (151) in the application database (50) by frame before processing advances to a software block 310.

The software in block 310 checks the bot date table (149) and deactivates any sensitivity bots with creation dates before the current system date. The software in the block then uses the information that was previously retrieved (from the system settings table (140), metadata mapping table (141), the conversion rules table (142), the frame definition table (143), the purchasing system database table (144), the simulation program table (148)—if data from there is being used, the buyer's Value and Risk System table (150) and the external factor forecasts table (152) as required to initialize the sensitivity bots. Bots are independent components of the application that have specific tasks to perform. In the case of sensitivity bots, their primary task is to determine the sensitivity of the optimal purchasing activity mix to changes in external factor price, deliverable price, feature price and supplier by frame. The optimization bots run simulations of purchasing activity, buyer risk and buyer return within the relevant portions of the matrix of value and/or the matrix of risk using a probabilistic simulation model such as a Monte Carlo Model for each frame. Other probabilistic simulation models can be used to the same effect. Every sensitivity bot activated in this block contains the information shown in Table 9.

TABLE 9

1. Unique ID number (based on date, hour, minute, second of creation)
2. Creation date (date, hour, minute, second)
3. Mapping information
4. Storage location
5. Variable: external factor, feature or supplier
6. Buyer
7. Frame After the sensitivity bots are initialized, the bots activate in accordance with their preprogrammed instructions. After being activated, the bots determine how sensitive buyer risk, buyer return and the optimal mix of features are to changes in the purchasing activity variables. The results of this analysis are saved in the sensitivity analysis table (154) in the application database (50) by frame before processing advances to a software block 322.

The software in block 322 checks the system settings table (140) in the application database (50) to determine if the current optimization includes volume purchase discount analyses. If the purchasing activity that is being optimized includes volume purchase discounts, then processing advances to a software block 323. Alternatively, if the purchasing activity that is being optimized does not include volume purchase discounts, then processing advances to a software block 402.

The software in block 323 identifies the frames being analyzed using data from the frame definition table (143) and then uses the information from the metadata mapping table (141) to identify the purchasing activity data that needs to be retrieved from the purchasing system database table (144) for the frames being analyzed. After retrieving the required purchasing data which includes the deliverable requirements for the time period, the current orders, items (deliverables) by supplier (resources), item (deliverable) history by supplier, volume purchase discount schedules and pricing information, processing advances to a software block 324.

The software in block 324 checks the system settings table (140) in the application database (50) to determine if the current optimization is limited to a volume purchase discount analysis. If the purchasing activity that is being optimized is limited to a volume purchase discount analysis, then processing advances to a software block 325. Alternatively, if the purchasing activity that is being optimized is not limited to only volume purchase discount analyses, then processing advances to a software block 304.

The software in block 304 retrieves the metadata mapping table (141) data as required to identify and retrieve Value and Risk data regarding the specific value drivers that are linked to purchased resources, deliverables and features for the selected frames before processing advances to a software block 305. The software in block 305 retrieves the external factor prices for the purchasing activity being analyzed from the external factor forecast table (152) before processing advances to a software block 307.

The software in block 307 checks the system settings table (140) to determine if simulation program data is being used in the purchasing activity analysis. If simulation program data is being used, then processing advances to a software block 308. Alternatively, if simulation program data is not being used, then processing advances to a software block 325. The software in block 308 retrieves the feature, resource and deliverable data for the purchasing activity being analyzed from the simulation program table (148) before processing advances to a software block 325.

The software in block 325 checks the bot date table (149) and deactivates any optimization bots with creation dates before the current system date and uses the previously retrieved information (from the system settings table (140), metadata mapping table (141), the conversion rules table (142), the frame definition table (143), the purchasing system database table (144), optionally, the simulation program table (148), the buyer's Value and Risk System table (150) and the external factor forecast table (152). Bots are independent components of the application that have specific tasks to perform. In the case of optimization bots, their primary task is to determine the optimal mix of purchasing activity features by frame. The optimal mix is the mix that maximizes value and minimizes risk for the frame being analyzed. The optimization bots run simulations of purchasing activity, buyer risk and buyer return within the relevant portions of the matrix of value and/or the matrix of risk using a genetic algorithm for each frame. Every optimization bot activated in this block contains the information shown in Table 10.

TABLE 10

1. Unique ID number (based on date, hour, minute, second of creation)
2. Creation date (date, hour, minute, second)
3. Mapping information
4. Storage location
5. Buyer
6. Frame After the optimization bots are initialized, the bots activate in accordance with their preprogrammed instructions. After being activated, the bots determine the mix of features options that optimize the purchasing activity for each frame when volume purchase discounts are taken in to account. The optimal mix is saved in the purchasing activity value table (151) in the application database (50) by frame before processing advances to a software block 310.

The software in block 310 checks the bot date table (149) and deactivates any sensitivity bots with creation dates before the current system date. The software in the block then uses the information that was previously retrieved (from the system settings table (140), metadata mapping table (141), the conversion rules table (142), the frame definition table (143), the purchasing system database table (144), the simulation program table (148)—if data from there is being used, the buyer's Value and Risk System table (150) and the external factor forecasts table (152) as required to initialize the sensitivity bots. Bots are independent components of the application that have specific tasks to perform. In the case of sensitivity bots, their primary task is to determine the sensitivity of the optimal purchasing activity mix to changes in external factor price, deliverable price, feature price and supplier by frame. The optimization bots run simulations of purchasing activity, buyer risk and buyer return within the relevant portions of the matrix of value and/or the matrix of risk using a probabilistic simulation model such as a Monte Carlo Model for each frame. Other probabilistic simulation models can be used to the same effect. Every sensitivity bot activated in this block contains the information shown in Table 11.

TABLE 11

1. Unique ID number (based on date, hour, minute, second of creation)
2. Creation date (date, hour, minute, second)
3. Mapping information
4. Storage location
5. Variable: external factor, feature or supplier
6. Buyer
7. Frame After the sensitivity bots are initialized, the bots activate in accordance with their preprogrammed instructions. After being activated, the bots determine how sensitive buyer risk, buyer return and the optimal mix of features are to changes in the purchasing activity variables. The results of this analysis are saved in the sensitivity analysis table (154) in the application database (50) by frame before processing advances to a software block 402.

Value and Risk Analysis

The flow diagrams in FIG. 6C, FIG. 6D, FIG. 6E and FIG. 6F detail the processing that is completed by the portion of the application software that continually creates the information stored in the Value and Risk System Database (44). This portion of the application software also generates a matrix of value and risk quantifying the impact of elements of value and external factors on the segments of value for each enterprise within the organization (see FIG. 7) by creating and activating analysis bots that:

1) Identify the factor variables, factor performance indicators and composite variables for each external factor that drive: three of the segments of value—current operation, derivatives and excess financial assets—as well as the components of current operation value (revenue, expense and changes in capital);

2) Identify the item variables, item performance indicators and composite variables for each element and sub-element of value that drive: three segments of value— current operation, derivatives and financial assets—as well as the components of current operation value (revenue, expense and changes in capital);
3) Create vectors that summarize the impact of the factor variables, factor performance indicators and composite variables for each external factor;
4) Create vectors that summarize the performance of the item variables, item performance indicators and composite variables for each element of value and sub-element of value in driving segment value;
5) Determine the expected life of each element of value and sub-element of value;
6) Determine the current operation value, excess financial asset value and derivative value, revenue component value, expense component value and capital component value of said current operations using the information prepared in the previous stages of processing;
7) Specify and optimize causal predictive models to determine the relationship between the vectors generated in steps 3 and 4 and the three segments of value, current operation, derivatives and financial assets, as well as the components of current operation value (revenue, expense and changes in capital);
8) Determine the appropriate discount rate on the basis of relative causal element strength, value the enterprise real options and contingent liabilities and determine the contribution of each element to real option valuation;
9) Determine the best causal indicator for enterprise stock price movement, calculate market sentiment and analyze the causes of market sentiment; and
10) Combine the results of all prior stages of processing to determine the value of each element, sub-element and factor for each enterprise and the organization.

Each analysis bot generally normalizes the data being analyzed before processing begins. While the processing in the preferred embodiment includes an analysis of all five segments of value for the organization, it is to be understood that the system of the present invention can complete calculations for any combination of the five segments. For example, when a company is privately held it does not have a market price and as a result the market sentiment segment of value is not analyzed.

Processing in this portion of the application begins in software block 342. The software in block 342 aggregates, converts and stores data from the advanced financial system database (6), basic financial system database (7), operation system database (8) and one or more asset system databases (9). After data storage is complete, processing advances to a software block 343.

The software in block 343 retrieves data from the system settings table (140), the meta data mapping table (141), the asset system table (159), the element/external factor definition table (162) and the frame definition table (143) and then assigns item variables, item performance indicators and composite variables to each element of value identified in the system settings table (140) using a three-step process. First, item variables, item performance indicators and composite variables are assigned to elements of value based on the asset management system they correspond to (for example, all item variables from a brand management system and all item performance indicators and composite variables derived from brand management system item variables are assigned to the brand element of value). Second, pre-defined composite variables are assigned to the element of value they were assigned to measure in the metadata mapping table (141). Finally, item variables, item performance indicators and composite variables identified by the text and geospatial bots are assigned to elements on the basis of their element classifications. If any item variables, item performance indicators or composite variables are un-assigned at this point, they are assigned to a going concern element of value. After the assignment of variables and indicators to elements is complete, the resulting assignments are saved to the element/external factor definition table (162) by enterprise and processing advances to a block 344.

The software in block 344 retrieves data from the meta data mapping table (141), the element/external factor definition table (162) and the frame definition table (143) and then assigns factor variables, factor performance indicators and composite factors to each external factor. Factor variables, factor performance indicators and composite factors identified by the text and geospatial bots are then assigned to factors on the basis of their factor classifications. The resulting assignments are saved to element/external factor definition table (162) by enterprise and processing advances to a block 345.

The software in block 345 checks the system settings table (140) in the application database (50) to determine if any of the enterprises in the organization being analyzed have market sentiment segments. If there are market sentiment segments for any enterprise, then processing advances to a block 346. Alternatively, if there are no market prices for equity for any enterprise, then processing advances to a software block 348.

The software in block 346 checks the bot date table (149) and deactivates any market value indicator bots with creation dates before the current system date. The software in block 346 then initializes market value indicator bots in accordance with the frequency specified by the user (20) in the system settings table (140). The bot retrieves the information from the system settings table (140), the metadata mapping table (141) and the element/external factor definition table (162) before saving the resulting information in the value and risk system database (44).

Bots are independent components of the application that have specific tasks to perform. In the case of market value indicator bots their primary task is to identify the best market value indicator (price, relative price, yield, first derivative of price change or second derivative of price change) for the time period being examined. The market value indicator bots select the best value indicator by grouping the S&P 500 using each of the five value indicators with a Kohonen neural network. The resulting clusters are then compared to the known groupings of the S&P 500. The market value indicator that produced the clusters that most closely match the known S&P 500 is selected as the market value indicator. Every market value indicator bot contains the information shown in Table 15.

TABLE 15

1. Unique ID number (based on date, hour, minute, second of creation)
2. Creation date (date, hour, minute, second)
3. Mapping information
4. Storage location
5. Organization
6. Enterprise When bots in block 346 have identified and stored the best market value indicator in the element/external factor definition table (162), processing advances to a block 347.

The software in block 347 checks the bot date table (149) and deactivates any temporal clustering bots with creation dates before the current system date. The software in block 347 then initializes a bot in accordance with the frequency specified by the user (20) in the system settings table (140). The bot retrieves information from the system settings table (140), the metadata mapping table (141) and the external database table (165) as required and defines regimes for the enterprise market value before saving the resulting cluster information in the value and risk system database (44).

Bots are independent components of the application that have specific tasks to perform. In the case of temporal clustering bots, their primary task is to segment the market price data by enterprise using the market value indicator selected by the bot in block 346 into distinct time regimes that share similar characteristics. The temporal clustering bot assigns a unique identification (id) number to each "regime" it identifies and stores the unique id numbers in the cluster id table (158). Every time period with data are assigned to one of the regimes. The cluster id for each regime is saved in the data record for each element variable and factor variable in the table where it resides by enterprise. If there are enterprises in the organization that don't have market sentiment calculations, then the time regimes from the primary enterprise specified by the user in the system settings table (140) are used in labeling the data for the other enterprises. After the regimes are identified, the element and factor variables for each enterprise are segmented into a number of regimes less than or equal to the maximum specified by the user (20) in the system settings table (140). The time periods are segmented for each enterprise with a market value using a competitive regression algorithm that identifies an overall, global model before splitting the data and creating new models for the data in each partition. If the error from the two models is greater than the error from the global model, then there is only one regime in the data. Alternatively, if the two models produce lower error than the global model, then a third model is created. If the error from three models is lower than from two models then a fourth model is added. The process continues until adding a new model does not improve accuracy. Other temporal clustering algorithms may be used to the same effect. Every temporal clustering bot contains the information shown in Table 16.

TABLE 16

1. Unique ID number (based on date, hour, minute, second of creation)
2. Creation date (date, hour, minute, second)
3. Mapping information
4. Storage location
5. Maximum number of clusters
6. Organization
7. Enterprise When bots in block 347 have identified and stored regime assignments for all time periods with data by enterprise, processing advances to a software block 348.

The software in block 348 checks the bot date table (149) and deactivates any variable clustering bots with creation dates before the current system date. The software in block 348 then initializes bots as required for each element of value and external factor by enterprise. The bots: activate in accordance with the frequency specified by the user (20) in the system settings table (140), retrieve the information from the system settings table (140), the metadata mapping table (141) and the element/external factor definition table (162) as required and define segments for the element variables and factor variables before saving the resulting cluster information in the value and risk system database (44).

Bots are independent components of the application that have specific tasks to perform. In the case of variable clustering bots, their primary task is to segment the element variables and factor variables into distinct clusters that share similar characteristics. The clustering bot assigns a unique id number to each "cluster" it identifies and stores the unique id numbers in the cluster id table (158). Every item variable for every element of value is assigned to one of the unique clusters. The cluster id for each variable is saved in the data record for each variable in the table where it resides. In a similar fashion, every factor variable for every external factor is assigned to a unique cluster. The cluster id for each variable is also saved in the data record for the factor variable (167). The item variables and factor variables are segmented into a number of clusters less than or equal to the maximum specified by the user (20) in the system settings table (140). The data are segmented using the "default" clustering algorithm the user (20) specified in the system settings table (140). The system of the present invention provides the user (20) with the choice of several clustering algorithms including: an unsupervised "Kohonen" neural network, neural network, decision tree, support vector method, K-nearest neighbor, expectation maximization (EM) and the segmental K-means algorithm. For algorithms that normally require the number of clusters to be specified, the bot will iterate the number of clusters until it finds the cleanest segmentation for the data. Every variable clustering bot contains the information shown in Table 17.

TABLE 17

1. Unique ID number (based on date, hour, minute, second of creation)
2. Creation date (date, hour, minute, second)
3. Mapping information
4. Storage location
5. Element of value, sub element of value or external factor
6. Clustering algorithm type
7. Organization
8. Enterprise
9. Maximum number of clusters
10. Variable 1
... to
10 + n. Variable n When bots in block 348 have identified and stored cluster assignments for the variables associated with each element of value, sub-element of value or external factor, processing advances to a software block 349.

The software in block 349 checks the bot date table (149) and deactivates any predictive model bots with creation dates before the current system date. The software in block 349 then retrieves the information from the system settings table (140), the metadata mapping table (141), the element/external factor definition table (162) and the segment definition table (176) as required to initialize predictive model bots for each component of value.

Bots are independent components of the application that have specific tasks to perform. In the case of predictive model bots, their primary task is to determine the relationship between the element and factor variables and the derivative segment of value, the excess financial asset segment of value and the current operation segment of value by enterprise. The predictive model bots also determine the relationship between the element variables and factor variables components of current operation value and sub-components of current operation value by enterprise. Predictive model bots are initialized for each component of value, sub-component of value, derivative segment and excess financial asset segment by enterprise. They are also initialized for each cluster and regime of data in accordance with the cluster and regime assignments specified by the bots in blocks 347 and 348 by enterprise. A series of predictive model bots is initialized at this stage because it is impossible to know in advance which predictive model type will produce the "best" predictive model for the data from each commercial enterprise. The series for each model includes 12 predictive model bot types: neural network; CART; GARCH, projection pursuit regression; generalized additive model (GAM), redundant regression network; rough-set analysis, boosted Naïve Bayes Regression; MARS; linear regression; support vector method and stepwise regression. Additional predictive model types can be used to the same effect. The software in block 349 generates this series of predictive model bots for the enterprise as shown in Table 18.

TABLE 18

Predictive models by enterprise level

Enterprise:

Variables* relationship to enterprise cash flow
(revenue − expense + capital change)
Variables* relationship to enterprise revenue component of value
Variables* relationship to enterprise expense subcomponents
of value
Variables* relationship to enterprise capital change subcomponents
of value
Variables* relationship to derivative segment of value
Variables* relationship to excess financial asset segment of value
Element of Value:

Sub-element of value variables relationship to element of value

*Variables = element and factor variables, item performance indicators.

Every predictive model bot contains the information shown in Table 19.

TABLE 19

1. Unique ID number (based on date, hour, minute, second of creation)
2. Creation date (date, hour, minute, second)
3. Mapping information
4. Storage location
5. Organization
6. Enterprise
7. Global or Cluster (ID) and/or Regime (ID)
8. Segment (Derivative, Excess Financial Asset or Current Operation)
9. Element, sub-element or external factor
10. Predictive Model Type After predictive model bots are initialized, the bots activate in accordance with the frequency specified by the user (20) in the system settings table (140). Once activated, the bots retrieve the required data from the appropriate table in the value and risk system database (44) and randomly partition the element or factor variables into a training set and a test set. The software in block 349 uses "bootstrapping" where the different training data sets are created by re-sampling with replacement from the original training set so data records may occur more than once. After the predictive model bots complete their training and testing, processing advances to a block 350.

The software in block 350 determines if clustering improved the accuracy of the predictive models generated by the bots in software block 349 by enterprise. The software in block 350 uses a variable selection algorithm such as stepwise regression (other types of variable selection algorithms can be used) to combine the results from the predictive model bot analyses for each type of analysis—with and without clustering—to determine the best set of variables for each type of analysis. The type of analysis having the smallest amount of error as measured by applying the mean squared error algorithm to the test data is given preference in determining the best set of variables for use in later analysis. There are four possible outcomes from this analysis as shown in Table 20.

TABLE 20

1. Best model has no clustering
2. Best model has temporal clustering, no variable clustering
3. Best model has variable clustering, no temporal clustering
4. Best model has temporal clustering and variable clustering If the software in block 350 determines that clustering improves the accuracy of the predictive models for an enterprise, then processing advances to a software block 353. Alternatively, if clustering does not improve the overall accuracy of the predictive models for an enterprise, then processing advances to a software block 351.

The software in block 351 uses a variable selection algorithm such as stepwise regression (other types of variable selection algorithms can be used) to combine the results from the predictive model bot analyses for each model to determine the best set of variables for each model. The models having the smallest amount of error as measured by applying the mean squared error algorithm to the test data is given preference in determining the best set of variables. As a result of this processing, the best set of variables contain: the item variables, factor variables, item performance indicators, factor performance indications, composite variables and composite factors that correlate most strongly with changes in the three segments being analyzed and the three components of value. The best set of variables will hereinafter be referred to as the "value drivers". Eliminating low correlation factors from the initial configuration of the vector creation algorithms increases the efficiency of the next stage of system processing. Other error algorithms alone or in combination may be substituted for the mean squared error algorithm. After the best set of variables have been selected and stored in the element variables table (163) or factor variables table (167) for all models at all levels for each enterprise in the organization, the software in block 351 tests the independence of the value drivers at the enterprise, external factor, element and sub-element level before processing advances to a block 352.

The software in block 352 checks the bot date table (149) and deactivates any causal predictive model bots with creation dates before the current system date. The software in block 352 then retrieves the information from the system settings table (140), the metadata mapping table (141), the segment definition table (176), the element variables table (163) and the factor variables table (167) as required to initialize causal predictive model bots for each element of value, sub-element of value and external factor in accordance with the frequency specified by the user (20) in the system settings table (140).

Bots are independent components of the application that have specific tasks to perform. In the case of causal predictive model bots, their primary task is to refine the element and factor variable selection to reflect only causal variables. (Note: these variables are summed together to value an element when they are interdependent). A series of causal predictive model bots are initialized at this stage because it is impossible to know in advance which causal predictive model will produce the "best" vector for the best fit variables from each model. The series for each model includes five causal predictive model bot types: Tetrad, MML, LaGrange, Bayesian and path analysis. The software in block 352 generates this series of causal predictive model bots for each set of variables stored in the element variables table (163) and factor variables table (167) in the previous stage in processing.

Every causal predictive model bot activated in this block contains the information shown in Table 21.

TABLE 21

1. Unique ID number (based on date, hour, minute, second of creation)
2. Creation date (date, hour, minute, second)
3. Mapping information
4. Storage location
5. Component or subcomponent of value
6. Element, sub-element or external factor
7. Variable set
8. Causal predictive model type
9. Organization
10. Enterprise After the causal predictive model bots are initialized by the software in block 352, the bots activate in accordance with the frequency specified by the user (20) in the system settings table (140). Once activated, they retrieve the required information for each model and sub-divide the variables into two sets, one for training and one for testing. After the causal predictive model bots complete their processing for each model, the software in block 352 uses a model selection algorithm to identify the model that best fits the data for each element of value, sub-element of value and external factor being analyzed. For the system of the present invention, a cross validation algorithm is used for model selection. The software in block 352 saves the best fit causal factors in the vector table (179) by enterprise in the value and risk system database (44) and processing advances to a block 358.

The software in block 358 tests the value drivers to see if there is interaction between elements, between elements and external factors or between external factors by enterprise. The software in this block identifies interaction by evaluating a chosen model based on stochastic-driven pairs of value-driver subsets. If the accuracy of such a model is higher that the accuracy of statistically combined models trained on attribute subsets, then the attributes from subsets are considered to be interacting and then they form an interacting set. If the software in block 358 does not detect any value driver interaction or missing variables for each enterprise, then system processing advances to a block 363. Alternatively, if missing data or value driver interactions across elements are detected by the software in block 358 for one or more enterprise, then processing advances to a software block 361.

If software in block 350 determines that clustering improves predictive model accuracy, then processing advances to block 353 as described previously. The software in block 353 uses a variable selection algorithm such as stepwise regression (other types of variable selection algorithms can be used) to combine the results from the predictive model bot analyses for each model, cluster and/or regime to determine the best set of variables for each model. The models having the smallest amount of error as measured by applying the mean squared error algorithm to the test data is given preference in determining the best set of variables. As a result of this processing, the best set of variables contains: the element variables and factor variables that correlate most strongly with changes in the components of value. The best set of variables will hereinafter be referred to as the "value drivers". Eliminating low correlation factors from the initial configuration of the vector creation algorithms increases the efficiency of the next stage of system processing. Other error algorithms alone or in combination may be substituted for the mean squared error algorithm. After the best set of variables have been selected and stored in the element variables table (163) or the factor variables table (167) for all models at all levels by enterprise, the software in block 353 tests the independence of the value drivers at the enterprise, element, sub-element and external factor level before processing advances to a block 354.

The software in block 354 checks the bot date table (149) and deactivates any causal predictive model bots with creation dates before the current system date. The software in block 354 then retrieves the information from the system settings table (140), the metadata mapping table (141), the segment definition table (176), the element variables table (163) and the factor variables table (167) as required to initialize causal predictive model bots for each element of value, sub-element of value and external factor at every level in accordance with the frequency specified by the user (20) in the system settings table (140).

Bots are independent components of the application that have specific tasks to perform. In the case of causal predictive model bots, their primary task is to refine the element and factor variable selection to reflect only causal variables. (Note: these variables are grouped together to represent a single element vector when they are dependent). In some cases it may be possible to skip the correlation step before selecting causal the item variables, factor variables, item performance indicators, factor performance indicators, composite variables and composite factors. A series of causal predictive model bots are initialized at this stage because it is impossible to know in advance which causal predictive model will produce the "best" vector for the best fit variables from each model. The series for each model includes four causal predictive model bot types: Tetrad, LaGrange, Bayesian and path analysis. The software in block 354 generates this series of causal predictive model bots for each set of variables stored in the element variables table (163) in the previous stage in processing. Every causal predictive model bot activated in this block contains the information shown in Table 22.

TABLE 22

1. Unique ID number (based on date, hour, minute, second of creation)
2. Creation date (date, hour, minute, second)
3. Mapping information
4. Storage location
5. Component or subcomponent of value
6. Cluster (ID) and/or Regime (ID)
7. Element, sub-element or external factor
8. Variable set
9. Organization
10. Enterprise
11. Causal predictive model type After the causal predictive model bots are initialized by the software in block 354, the bots activate in accordance with the frequency specified by the user (20) in the system settings table (140). Once activated, they retrieve the required information for each model and sub-divide the variables into two sets, one for training and one for testing. The same set of training data is used by each of the different types of bots for each model. After the causal predictive model bots complete their processing for each model, the software in block 354 uses a model selection algorithm to identify the model that best fits the data for each element, sub-element or external factor being analyzed by model and/or regime by enterprise. For the system of the present invention, a cross validation algorithm is used for model selection. The software in block 354 saves the best fit causal factors in the vector table (179) by enterprise in the value and risk system database (44) and processing advances to block 358. The software in block 358 tests the value drivers to see if there are "missing" value drivers that are influencing the results as well as testing to see if there are interactions (dependencies) across elements. If the software in block 358 does not detect any missing data or value driver interactions across elements, then system processing advances to a block 363. Alternatively, if missing data or value driver interactions across elements are detected by the software in block 358, then processing advances to a software block 361.

The software in block 361 prompts the user (20) via the structure revision window (907) to adjust the specification(s) for the affected elements of value, sub-elements of value or external factors as required to minimize or eliminate the interaction. At this point the user (20) has the option of specifying that one or more elements of value, sub elements of value and/or external factors be combined for analysis purposes (element combinations and/or factor combinations) for each enterprise where there is interaction between elements and/or factors. The user (20) also has the option of specifying that the elements or external factors that are interacting will be valued by summing the impact of their value drivers. Finally, the user (20) can chose to re-assign a value driver to a new element of value to eliminate the inter-dependency. This is the preferred solution when the inter-dependent value driver is included in the going concern element of value. Elements and external factors that will be valued by summing their value drivers will not have vectors generated. After the input from the user (20) is saved in the system settings table (140), and the element/external factor definition table (162) system processing advances to a software block 363. The software in block 363 checks the system settings table (140) and the element/external factor definition table (162) to see if there any changes in structure. If there have been changes in the structure, then processing advances to a block 205 and the system processing described previously is repeated. Alternatively, if there are no changes in structure, then processing advances to a block 364.

The software in block 364 checks the bot date table (149) and deactivates any industry rank bots with creation dates before the current system date. The software in block 364 then retrieves the information from the system settings table (140), the metadata mapping table (141), and the vector table (179) as required to initialize industry rank bots for the enterprise and for the industry in accordance with the frequency specified by the user (20) in the system settings table (140).

Bots are independent components of the application that have specific tasks to perform. In the case of industry rank bots, their primary task is to determine the relative position of each enterprise being evaluated on element variables identified in the previous processing step. (Note: these variables are grouped together when they are interdependent). The industry rank bots use ranking algorithms such as Data Envelopment Analysis (hereinafter, DEA) to determine the relative industry ranking of the enterprise being examined. The software in block 364 generates industry rank bots for each enterprise being evaluated. Every industry rank bot activated in this block contains the information shown in Table 23.

TABLE 23

1. Unique ID number (based on date, hour, minute, second of creation)
2. Creation date (date, hour, minute, second)
3. Mapping information
4. Storage location
5. Ranking algorithm
6. Organization
7. Enterprise After the industry rank bots are initialized by the software in block 364, the bots activate in accordance with the frequency specified by the user (20) in the system settings table (140). Once activated, they retrieve the item variables, item performance indicators, and composite variables from the value and risk system database (44) and sub-divides them into two sets, one for training and one for testing. After the industry rank bots develop and test their rankings, the software in block 364 saves the industry rankings in the vector table (179) by enterprise in the value and risk system database (44) and processing advances to a block 365. The industry rankings are item variables.

The software in block 365 checks the bot date table (149) and deactivates any vector generation bots with creation dates before the current system date. The software in block 365 then initializes bots for each element of value, sub-element of value and external factor for each enterprise in the organization. The bots activate in accordance with the frequency specified by the user (20) in the system settings table (140), retrieve the information from the system settings table (140), the metadata mapping table (141), the segment definition table (176) and the element variables table (163) as required to initialize vector generation bots for each element of value and sub-element of value in accordance with the frequency specified by the user (20) in the system settings table (140).

Bots are independent components of the application that have specific tasks to perform. In the case of vector generation bots, their primary task is to produce formulas, (hereinafter, vectors) that summarize the relationship between the causal element variables or causal factor variables and changes in the component or sub-component of value being examined for each enterprise. The causal element variables may be grouped by element of value, sub-element of value, external factor, factor combination or element combination. As discussed previously, the vector generation step is skipped for elements and factors where the user has specified that value driver impacts will be mathematically summed to determine the value of the element or factor. The vector generation bots use induction algorithms to generate the vectors. Other vector generation algorithms can be used to the same effect. The software in block 365 generates a vector generation bot for each set of variables stored in the element variables table (163) and factor variables table (167). Every vector generation bot contains the information shown in Table 24.

TABLE 24

1. Unique ID number (based on date, hour, minute, second of creation)
2. Creation date (date, hour, minute, second)
3. Mapping information
4. Storage location
5. Organization
6. Enterprise
7. Element, sub-element, element combination, factor or factor combination
8. Component or sub-component of value
9. Factor 1
... to
9 + n. Factor n When bots in block 365 have identified and stored vectors for all time periods with data for all the elements, sub-elements, element combination, factor combination or external factor where vectors are being calculated in the vector table (179) by enterprise, processing advances to a software block 366.

The software in block 366 checks the bot date table (149) and deactivates any financial factor bots with creation dates before the current system date. The software in block 366 then retrieves the information from the system settings table (140), the metadata mapping table (141), the element/external factor definition table (162), the element variables table (163), the derivatives table (161), the financial forecasts table (168) and the factor variables table (167) as required to initialize causal external factor bots for the enterprise and the relevant industry in accordance with the frequency specified by the user (20) in the system settings table (140).

Bots are independent components of the application that have specific tasks to perform. In the case of financial factor bots, their primary task is to identify elements of value, value drivers and external factors that are causal factors for changes in the value of: derivatives, financial assets, enterprise equity and industry equity. The causal factors for enterprise equity and industry equity are those that drive changes in the value indicator identified by the value indicator bots. A series of financial factor bots are initialized at this stage because it is impossible to know in advance which causal factors will produce the "best" model for every derivative, financial asset, enterprise or industry. The series for each model includes five causal predictive model bot types: Tetrad, LaGrange, MML, Bayesian and path analysis. Other causal predictive models can be used to the same effect. The software in block 366 generates this series of causal predictive model bots for each set of variables stored in the element variables table (163) and factor variables table (167) in the previous stage in processing by enterprise. Every financial factor bot activated in this block contains the information shown in Table 25.

TABLE 25

1. Unique ID number (based on date, hour, minute, second of creation)
2. Creation date (date, hour, minute, second)
3. Mapping information
4. Storage location
5. Element, value driver or external factor
6. Organization
7. Enterprise
8. Type: derivatives, financial assets, enterprise equity or industry equity
9. Value indicator (price, relative price, first derivative, etc.) for enterprise and industry only
10. Causal predictive model type After the software in block 366 initializes the financial factor bots, the bots activate in accordance with the frequency specified by the user (20) in the system settings table (140). Once activated, they retrieve the required information and sub-divide the data into two sets, one for training and one for testing. The same set of training data is used by each of the different types of bots for each model. After the financial factor bots complete their processing for each segment of value, enterprise and industry, the software in block 366 uses a model selection algorithm to identify the model that best fits the data for each. For the system of the present invention, a cross validation algorithm is used for model selection. The software in block 366 saves the best fit causal factors in the factor variables table (167) by enterprise and the best fit causal elements and value drivers in the element variables table (163) by enterprise and processing advances to a block 367. The software in block 367 tests to see if there are "missing" causal factors, elements or value drivers that are influencing the results by enterprise. If the software in block 367 does not detect any missing factors, elements or value drivers, then system processing advances to a block 368. Alternatively, if missing factors, elements or value drivers are detected by the software in block 367, then processing returns to software block 361 and the processing described in the preceding section is repeated.

The software in block 368 checks the bot date table (149) and deactivates any option bots with creation dates before the current system date. The software in block 368 then retrieves the information from the system settings table (140), the metadata mapping table (141), the basic financial system table (160), the external database table (165), the advanced finance system table (157) and the vector table (179) as required to initialize option bots for the enterprise.

Bots are independent components of the application that have specific tasks to perform. In the case of option bots, their primary tasks are to calculate the discount rate to be used for valuing the real options and contingent liabilities and to value the real options and contingent liabilities for the enterprise. If the user (20) has chosen to include industry options, then option bots will be initialized for industry options as well. The discount rate for enterprise real options is calculated by adding risk factors for each causal element to a base discount rate. A two step process determines the risk factor for each causal element. The first step in the process divides the maximum real option discount rate (specified by the user in system settings) by the number of causal elements. The second step in the process determines if the enterprise is highly rated on the causal elements using ranking algorithms like DEA and determines an appropriate risk factor. If the enterprise is highly ranked on the soft asset, then the discount rate is increased by a relatively small amount for that causal element. Alternatively, if the enterprise has a low ranking on a causal element, then the discount rate is increased by a relatively large amount for that causal element as shown below in Table 26.

TABLE 26

| Maximum discount rate = 50%, Causal elements = 5 Maximum risk factor/soft asset = 50%/5 = 10% | |
|---|---|
| Industry Rank on Soft Asset | % of Maximum |
| 1 | 0% |
| 2 | 25% |
| 3 | 50% |
| 4 | 75% |
| 5 or higher | 100% |

| Causal element: | Relative Rank | Risk Factor |
|---|---|---|
| Brand | 1 | 0% |
| Channel | 3 | 5% |
| Manufacturing Process | 4 | 7.5% |
| Strategic Alliances | 5 | 10% |
| Vendors | 2 | 2.5% |
| Subtotal | | 25% |
| Base Rate | | 12% |
| Discount Rate | | 37% |

The discount rate for industry options is calculated using a traditional total cost of capital approach that includes the cost of risk capital in a manner that is well known. After the appropriate discount rates are determined, the value of each real option and contingent liability is calculated using the specified algorithms in a manner that is well known. The real option can be valued using a number of algorithms including Black Scholes, binomial, neural network or dynamic programming algorithms. The industry option bots use the industry rankings from prior processing block to determine an allocation percentage for industry options. The more dominant the enterprise, as indicated by the industry rank for the element indicators, the greater the allocation of industry real options. Every option bot contains the information shown in Table 27.

TABLE 27

1. Unique ID number (based on date, hour, minute, second of creation)
2. Creation date (date, hour, minute, second)
3. Mapping information
4. Storage location
5. Organization
6. Industry or Enterprise
7. Real option type (Industry or Enterprise)
8. Real option algorithm (Black Scholes, Binomial, Quadranomial, Dynamic Program, etc.)

After the option bots are initialized, they activate in accordance with the frequency specified by the user (20) in the system settings table (140). After being activated, the bots retrieve information as required to complete the option valuations. When they are used, industry option bots go on to allocate a percentage of the calculated value of industry options to the enterprise on the basis of causal element strength. After the value of the real option, contingent liability or allocated industry option is calculated the resulting values are then saved in the real option value table (173) in the value and risk system database (44) by enterprise before processing advances to a block 369.

The software in block 369 checks the bot date table (149) and deactivates any cash flow bots with creation dates before the current system date. The software in the block then retrieves the information from the system settings table (140), the metadata mapping table (141), the advanced finance system table (157) and the segment definition table (176) as required to initialize cash flow bots for each enterprise in accordance with the frequency specified by the user (20) in the system settings table (140).

Bots are independent components of the application that have specific tasks to perform. In the case of cash flow bots, their primary tasks are to calculate the cash flow for each enterprise for every time period where data are available and to forecast a steady state cash flow for each enterprise in the organization. Cash flow is calculated using the forecast revenue, expense, capital change and depreciation data retrieved from the advanced finance system table (157) with a well-known formula where cash flow equals period revenue minus period expense plus the period change in capital plus non-cash depreciation/amortization for the period. The steady state cash flow for each enterprise is calculated for the enterprise using forecasting methods identical to those disclosed previously in U.S. Pat. No. 5,615,109 to forecast revenue, expenses, capital changes and depreciation separately before calculating the cash flow. Every cash flow bot contains the information shown in Table 28.

TABLE 28

1. Unique ID number (based on date, hour, minute, second of creation)
2. Creation date (date, hour, minute, second)
3. Mapping information
4. Storage location
5. Organization
6. Enterprise After the cash flow bots are initialized, the bots activate in accordance with the frequency specified by the user (20) in the system settings table (140). After being activated the bots, retrieve the forecast data for each enterprise from the advanced finance system table (157) and then calculate a steady state cash flow forecast by enterprise. The resulting values by period for each enterprise are then stored in the cash flow table (156) in the value and risk system database (44) before processing advances to a block 371.

The software in block 371 uses the cash flow by period data from the cash flow table (156) and the calculated requirement for working capital to calculate the value of excess financial assets for every time period by enterprise and stores the results of the calculation in the financial forecasts table (168) in the application database before processing advances to a block 372.

The software in block 372 checks the bot date table (149) and deactivates any financial value bots with creation dates before the current system date. The software in block 372 then retrieves the information from the system settings table (140), the metadata mapping table (141), the element/external factor definition table (162), the element variables table (163), the derivatives table (161) the financial forecasts table (168) and the factor variables table (167) as required to initialize financial value bots for the derivatives and excess financial assets in accordance with the frequency specified by the user (20) in the system settings table (140).

Bots are independent components of the application that have specific tasks to perform. In the case of financial value bots, their primary task is to determine the relative contribution of element data and factor data identified in previous stages of processing on the value of derivatives and excess financial assets by enterprise. The system of the present invention uses 12 different types of predictive models to determine relative contribution: neural network; CART; projection pursuit regression; generalized additive model (GAM); GARCH; MMDR; redundant regression network; boosted Naïve Bayes Regression; the support vector method; MARS; linear regression; and stepwise regression. The model having the smallest amount of error as measured by applying the mean squared error algorithm to the test data is the best fit model. The "relative contribution algorithm" used for completing the analysis varies with the model that was selected as the "best-fit" as described previously. Every financial value bot activated in this block contains the information shown in Table 29.

TABLE 29

1. Unique ID number (based on date, hour, minute, second of creation)
2. Creation date (date, hour, minute, second)
3. Mapping information
4. Storage location
5. Organization
6. Enterprise
7. Derivative or Excess Financial Asset
8. Element Data or Factor Data
9. Predictive model type After the software in block 372 initializes the financial value bots, the bots activate in accordance with the frequency specified by the user (20) in the system settings table (140). Once activated, they retrieve the required information and subdivide the data into two sets, one for training and one for testing. The same set of training data is used by each of the different types of bots for each model. After the financial bots complete their processing, the software in block 372 saves the calculated value contributions by element or external factor for derivatives in the derivatives table (161) by enterprise. The calculated value contributions by element or external factor for excess financial assets are then saved in the financial forecasts table (168) by enterprise in the value and risk system database (44) and processing advances to a block 373.

The software in block 373 checks the bot date table (149) and deactivates any element life bots with creation dates before the current system date. The software in block 373 then retrieves the information from the system settings table (140), the metadata mapping table (141) and the element/external factor definition table (162) as required to initialize element life bots for each element and sub-element of value for each enterprise in the organization being analyzed.

Bots are independent components of the application that have specific tasks to perform. In the case of element life bots, their primary task is to determine the expected life of each element and sub-element of value. There are three methods for evaluating the expected life of the elements and sub-elements of value. Elements of value that are defined by a population of members or items (such as: channel partners, customers, employees and vendors) will have their lives estimated by analyzing and forecasting the lives of the members of the population. The forecasting of member lives will be determined by the "best" fit solution from competing life estimation methods including the Iowa type survivor curves, Weibull distribution survivor curves, Gompertz-Makeham survivor curves, polynomial equations using the methodology for selecting from competing forecasts disclosed in U.S. Pat. No. 5,615,109. Elements of value (such as some parts of Intellectual Property i.e. patents and insurance contracts) that have legally defined lives will have their lives calculated using the time period between the current date and the expiration date of the element or sub-element. Finally, elements of value and sub-element of value (such as brand names, information technology and processes) that may not have defined lives and/or that may not consist of a collection of members will have their lives estimated as a function of the enterprise Competitive Advantage Period (CAP). In the latter case, the estimate will be completed using the element vector trends and the stability of relative element strength. More specifically, lives for these element types are estimated by 1) subtracting time from the CAP for element volatility that exceeds cap volatility; and/or
2) subtracting time for relative element strength that is below the leading position and/or relative element strength that is declining;

The resulting values are stored in the element/external factor definition table (162) for each element and sub-element of value by enterprise. Every element life bot contains the information shown in Table 30.

TABLE 30

1. Unique ID number (based on date, hour, minute, second of creation)
2. Creation date (date, hour, minute, second)
3. Mapping information
4. Storage location
5. Organization
6. Enterprise
7. Element or sub-element of value
8. Life estimation method (item analysis, date calculation or relative to CAP)

After the element life bots are initialized, they are activated in accordance with the frequency specified by the user (20) in the system settings table (140). After being activated, the bots retrieve information for each element and sub-element of value from the element/external factor definition table (162) as required to complete the estimate of element life. The resulting values are then saved in the element/external factor definition table (162) by enterprise in the value and risk system database (44) before processing advances to a block 374.

The software in block 374 checks the system settings table (140) in the application database (50) to determine if the current calculation is a new calculation or a structure change. If the calculation is not a new calculation or a structure change, then processing advances to a software block 383. Alternatively, if the calculation is new or a structure change, then processing advances to a software block 375.

The software in block 375 checks the bot date table (149) and deactivates any component capitalization bots with creation dates before the current system date. The software in block 375 then retrieves the information from the system settings table (140), the metadata mapping table (141) and the segment definition table (176) as required to initialize component capitalization bots for each enterprise in the organization.

Bots are independent components of the application that have specific tasks to perform. In the case of component capitalization bots, their task is to determine the capitalized value of the components and subcomponents of value—forecast revenue, forecast expense or forecast changes in capital for each enterprise in the organization in accordance with the formula shown in Table 31.

TABLE 31

$$\text{Value} = F_{f1}/(1 + K) + F_{f2}/(1 + K)^2 + F_{f3}/(1 + K)^3 + F_{f4}/(1 + K)^4 + (F_{f4} \times (1 + g))/(1 + K)^5 + (F_{f4} \times (1 + g)^2)/(1 + K)^6) \ldots + (F_{f4} \times (1 + g)^N)/(1 + K)^{N+4})$$

Where:
$F_{fx}$ = Forecast revenue, expense or capital requirements for year x after valuation date (from advanced finance system)
N = Number of years in CAP (from prior calculation)
K = Total average cost of capital – % per year (from prior calculation)
g = Forecast growth rate during CAP – % per year (from advanced financial system)

After the calculation of capitalized value of every component and sub-component of value is complete, the results are stored in the segment definition table (176) by enterprise in the value and risk system database (44). Every component capitalization bot contains the information shown in Table 32.

TABLE 32

1. Unique ID number (based on date, hour, minute, second of creation)
2. Creation date (date, hour, minute, second)
3. Mapping information
4. Storage location
5. Organization
6. Enterprise
7. Component of value (revenue, expense or capital change)
8. Sub component of value After the component capitalization bots are initialized, they activate in accordance with the frequency specified by the user (20) in the system settings table (140). After being activated, the bots retrieve information for each component and sub-component of value from the advanced finance system table (157) and the segment definition table (176) as required to calculate the capitalized value of each component for each enterprise in the organization. The resulting values are then saved in the segment definition table (176) in the value and risk system database (44) by enterprise before processing advances to a block 376.

The software in block 376 checks the bot date table (149) and deactivates any current operation bots with creation dates before the current system date. The software in block 376 then retrieves the information from the system settings table (140), the metadata mapping table (141), the element/external factor definition table (162), the segment definition table (176), the vector table (179), the financial forecasts table (168) and the factor variables table (167) as required to initialize valuation bots for each element of value, sub-element of value, combination of elements, value driver and/or external factor for the current operation.

Bots are independent components of the application that have specific tasks to perform. In the case of current operation bots, their task is to calculate the contribution of every element of value, sub-element of value, element combination, value driver, external factor and factor combination to the current operation segment of enterprise value. For calculating the current operation portion of element value, the bots use the procedure outlined in Table 5. The first step in completing the calculation in accordance with the procedure outlined in Table 5, is determining the relative contribution of each element, sub-element, combination of elements or value driver by using a series of predictive models to find the best fit relationship between:

1. The element of value vectors, element combination vectors and external factor vectors, factor combination vectors and value drivers and the enterprise components of value they correspond to; and
2. The sub-element of value vectors and the element of value they correspond to.

The system of the present invention uses 12 different types of predictive models to identify the best fit relationship: neural network; CART; projection pursuit regression; generalized additive model (GAM); GARCH; MMDR; redundant regression network; boosted Naïve Bayes Regression; the support vector method; MARS; linear regression; and stepwise regression. The model having the smallest amount of error as measured by applying the mean squared error algorithm to the test data is the best fit model. The "relative contribution algorithm" used for completing the analysis varies with the model that was selected as the "best-fit". For example, if the "best-fit" model is a neural net model, then the portion of revenue attributable to each input vector is determined by the formula shown in Table 33.

TABLE 33

$$\left(\sum_{k=1}^{k=m}\sum_{j=1}^{j=n} I_{jk} \times O_k \Big/ \sum_{j=1}^{j=n} I_{jk}\right) \Big/ \sum_{k=1}^{k=m}\sum_{j=1}^{j=n} I_{jk} \times O_k$$

Where
$I_{jk}$ = Absolute value of the input weight from input node j to hidden node k
$O_k$ = Absolute value of output weight from hidden node k
M = number of hidden nodes
N = number of input nodes After the relative contribution of each element of value, sub-element of value, external factor, element combination, factor combination and value driver to the components of current operation value is determined, the results of this analysis are combined with the previously calculated information regarding element life and capitalized component value to complete the valuation of each: element of value, sub-element of value, external factor, element combination, factor combination and value driver using the approach shown in Table 34.

TABLE 34

| Component Values: | Percentage | Element Life/CAP | Net Value |
|---|---|---|---|
| Revenue value = $120M | 20% | 80% | Value = $19.2M |
| Expense value = ($80M) | 10% | 80% | Value = ($6.4)M |
| Capital value = ($5M) | 5% | 80% | Value = ($0.2)M |
| Total value = $35M | | | |
| Net value for this element: | | | Value = $12.6M |

The resulting values are stored in: the element/external factor definition table (162) for each element of value, sub-element of value, element combination and value driver by enterprise. For external factor and factor combination value calculations, the external factor percentage is multiplied by the capitalized component value to determine the external factor value. The resulting values for external factors are saved in the element/external factor definition table (162) by enterprise.

Every current operation bot contains the information shown in Table 35.

TABLE 35

1. Unique ID number (based on date, hour, minute, second of creation)
2. Creation date (date, hour, minute, second)
3. Mapping information
4. Storage location
5. Organization
6. Enterprise
7. Element, sub-element, factor, element combination, factor combination or value driver
8. Component of value (revenue, expense or capital change)

After the current operation bots are initialized by the software in block 376, they activate in accordance with the frequency specified by the user (20) in the system settings table (140). After being activated, the bots retrieve information and complete the valuation for the segment being analyzed. As described previously, the resulting values are then saved in the element/external factor definition table (162) in the value and risk system database (44) by enterprise before processing advances to a block 377.

The software in block 377 checks the bot date table (149) and deactivates any residual bots with creation dates before the current system date. The software in block 377 then retrieves the information from the system settings table (140), the metadata mapping table (141) and the element/external factor definition table (162) as required to initialize residual bots for the each enterprise in the organization.

Bots are independent components of the application that have specific tasks to perform. In the case of residual bots, their task is to retrieve data as required from the element/external factor definition table (162) and the segment definition table (176) in order to calculate the residual going concern value for each enterprise in accordance with the formula shown in Table 36.

TABLE 36

Residual Going Concern Value = Total Current-Operation Value − Σ Required Financial Asset Values − Σ Elements of Value − Σ External Factors Every residual bot contains the information shown in Table 37.

TABLE 37

1. Unique ID number (based on date, hour, minute, second of creation)
2. Creation date (date, hour, minute, second)
3. Mapping information
4. Storage location
5. Organization
6. Enterprise After the residual bots are initialized they activate in accordance with the frequency specified by the user (20) in the system settings table (140). After being activated, the bots retrieve information as required to complete the residual calculation for each enterprise. After the calculation is complete, the resulting values are then saved in the element/external factor definition table (162) by enterprise in the value and risk system database (44) before processing advances to a software block 378.

The software in block 378 determines the contribution of each element of value to the value of the real option segment of value for each enterprise. For enterprise options, the value of each element is determined by comparing the value of the enterprise options to the value that would have been calculated if the element had an average level of strength. Elements that are relatively strong, reduce the discount rate and increase the value of the option. In a similar fashion, elements that are below average in strength increase the discount rate and decrease the value of the option. The value impact can be determined by subtracting the calculated value of the option from the value of the option with the average element. The resulting values are saved in the element/external factor definition table (162) by enterprise before processing advances to block 379.

The software in block 379 checks the bot date table (149) and deactivates any sentiment calculation bots with creation dates before the current system date. The software in block 379 then retrieves the information from the system settings table (140), the metadata mapping table (141), the external database table (165), the element/external factor definition table (162), the segment definition table (176), the real option value table (173) and the derivatives table (161) as required to initialize sentiment calculation bots for the organization.

Bots are independent components of the application that have specific tasks to perform. In the case of sentiment calculation bots, their task is to retrieve data as required and then calculate the sentiment for each enterprise in accordance with the formula shown in Table 38.

TABLE 38

Sentiment = Market Value for Enterprise − Current Operation Value − Σ Real Option Values − Value of Excess Financial Assets − Σ Derivative Values Enterprises that are not public corporations will, of course, not have a market value so no calculation will be completed for these enterprises. The sentiment for the organization will be calculated by subtracting the total for each of the five segments of value for all enterprises in the organization from the total market value for all enterprises in the organization. Every sentiment calculation bot contains the information shown in Table 39.

TABLE 39

1. Unique ID number (based on date, hour, minute, second of creation)
2. Creation date (date, hour, minute, second)
3. Mapping information
4. Storage location
5. Organization
6. Enterprise
7. Type: Organization or Enterprise After the sentiment calculation bots are initialized, they activate in accordance with the frequency specified by the user (20) in the system settings table (140). After being activated, the bots retrieve information from the system settings table (140), the external database table (165), the element/external factor definition table (162), the segment definition table (176), the real option value table (173), the derivatives table (161) and the financial forecasts table (168) as required to complete the sentiment calculation for each enterprise and the organization. After the calculation is complete, the resulting values are then saved in the enterprise sentiment table (164) in the value and risk system database (44) before processing advances to a block 380.

The software in block 380 checks the bot date table (149) and deactivates any sentiment analysis bots with creation dates before the current system date. The software in block 380 then retrieves the information from the system settings table (140), the metadata mapping table (141), the external database table (165), the industry ranking table (170), the element/external factor definition table (162), the segment definition table (176), the real option value table (173), the vector table (179) and the enterprise sentiment table (164) as required to initialize sentiment analysis bots for the enterprise.

Bots are independent components of the application that have specific tasks to perform. In the case of sentiment analysis bots, their primary task is to determine the composition of the calculated sentiment for each enterprise in the organization and the organization as a whole. One part of this analysis is completed by comparing the portion of overall market value that is driven by the different elements of value as determined by the bots in software block 366 and the calculated valuation impact of each element of value on the segments of value as shown below in Table 40.

TABLE 40

Total Enterprise Market Value = $100 Billion,
10% driven by Brand factors
Implied Brand Value = $100 Billion × 10% = $10 Billion
Brand Element Current Operation Value = $6 Billion
Increase/(Decrease) in Enterprise Real Option Values*
Due to Brand = $1.5 Billion
Increase/(Decrease) in Derivative Values due to Brands = $0.0
Increase/(Decrease) in excess Financial Asset Values due to Brands = $0.25 Billion
Brand Sentiment = $10 − $6 − $1.5 − $0.0 − $0.25 = $2.25 Billion

*includes allocated industry options when used in the calculation

The sentiment analysis bots also determine the impact of external factors on sentiment. Every sentiment analysis bot contains the information shown in Table 41.

TABLE 41

1. Unique ID number (based on date, hour, minute, second of creation)
2. Creation date (date, hour, minute, second)
3. Mapping information
4. Storage location
5. External factor or element of value
6. Organization
7. Enterprise After the sentiment analysis bots are initialized, they activate in accordance with the frequency specified by the user (20) in the system settings table (140). After being activated, the bots retrieve information from the system settings table (140), the metadata mapping table (141), the industry ranking table (170), the element/external factor definition table (162), the segment definition table (176), the real option value table (173), the enterprise sentiment table (164), the derivatives table (161) and the financial forecasts table (168) as required to analyze sentiment. The resulting breakdown of sentiment is then saved in the enterprise sentiment table (164) by enterprise in the value and risk system database (44). Sentiment at the organization level is calculated by adding together the sentiment calculations for all the enterprises in the organization. The results of this calculation are also saved in the enterprise sentiment table (164) in the value and risk system database (44) before processing advances to a software block 383 where the risk analysis for the organization is started.

Figure 6F:
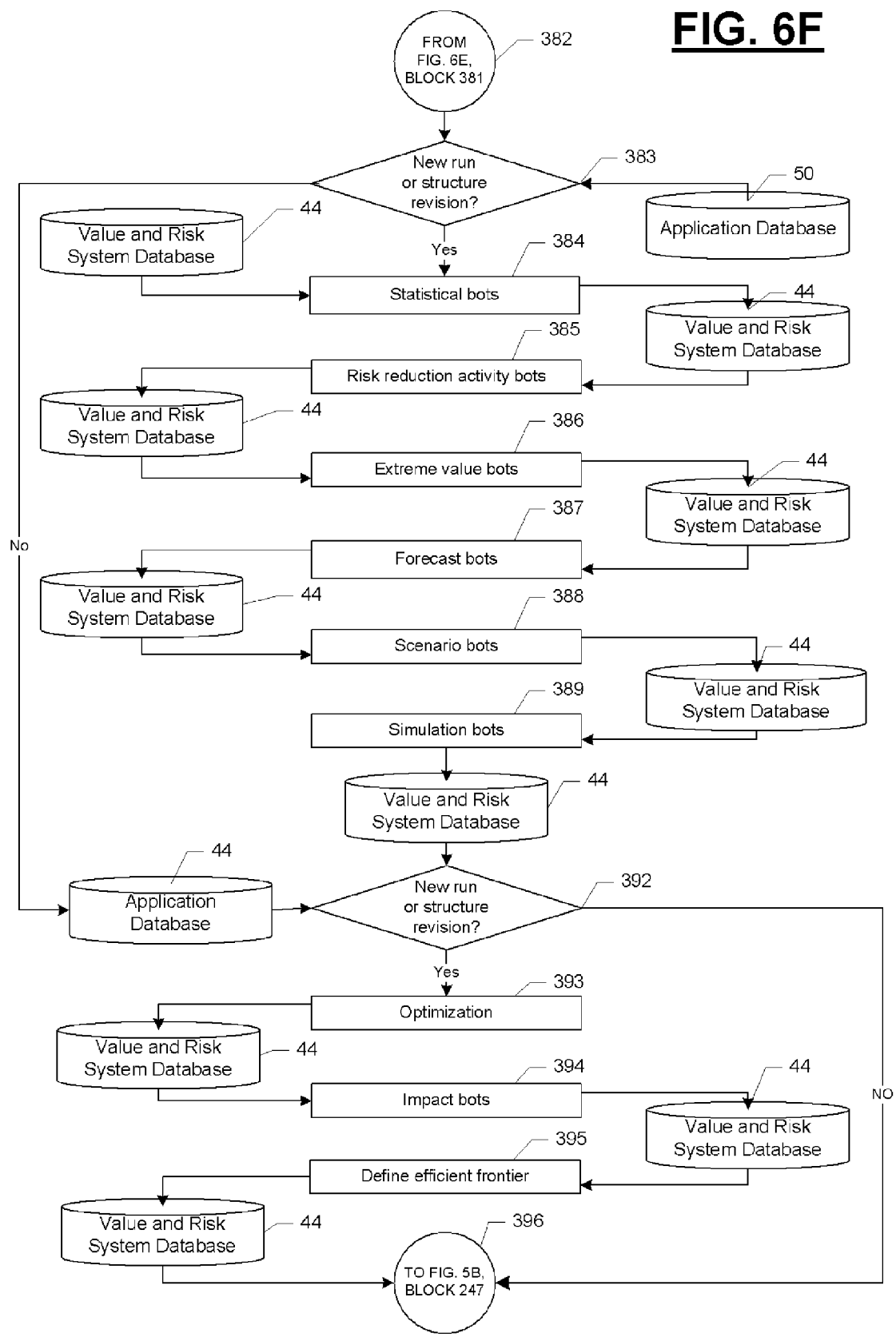

The flow diagram in FIG. 6F details the processing that is completed by the portion of the application software that analyzes and develops the matrix of risk (FIG. 7) for each enterprise in the organization. The matrix of risk includes two types of risk—the risk associated with volatility in the elements and factors driving enterprise value and the risk associated with events like hurricanes and competitor actions.

System processing in this portion of the application software (400) begins in a block 383. The software in block 383 checks the system settings table (140) in the application database (50) to determine if the current calculation is a new calculation or a structure change. If the calculation is not a new calculation or a structure change, then processing advances to a software block 392. Alternatively, if the calculation is new or a structure change, then processing advances to a software block 384.

The software in block 384 checks the bot date table (149) and deactivates any statistical bots with creation dates before the current system date. The software in block 384 then retrieves the information from the system settings table (140), the external database table (165), the element/external factor definition table (162), the element variables table (163) and the factor variables table (167) as required to initialize statistical bots for each causal value driver and external factor.

Bots are independent components of the application that have specific tasks to perform. In the case of statistical bots, their primary tasks are to calculate and store statistics such as mean, median, standard deviation, slope, average period change, maximum period change, variance and covariance for each causal value driver and external factor for all value drivers and external factors. Covariance with the market as a whole is also calculated for each value driver and external factor. Every statistical bot contains the information shown in Table 42.

TABLE 42

1. Unique ID number (based on date, hour, minute, second of creation)
2. Creation date (date, hour, minute, second)
3. Mapping information
4. Storage location
5. Organization
6. Enterprise
7. Value driver, element variable or factor variable When bots in block 384 have identified and stored statistics for each causal value driver and external factor in the statistics table (178) by enterprise, processing advances to a software block 385.

The software in block 385 checks the bot date table (149) and deactivates any risk reduction activity bots with creation dates before the current system date. The software in block 385 then retrieves the information from the system settings table (140), the external database table (165), the element/external factor definition table (162), the element variables table (163), the factor variables table (167) and the statistics table (178) as required to initialize risk reduction activity bots for each causal value driver and external factor.

Bots are independent components of the application that have specific tasks to perform. In the case of risk reduction activity bots, their primary tasks are to identify actions that can be taken by the enterprise to reduce risk. For example, if one customer presents a significant risk to the enterprise, then the risk reduction bot might identify a reduction in the credit line for that customer to reduce the risk. Every risk reduction activity bot contains the information shown in Table 43.

TABLE 43

1. Unique ID number (based on date, hour, minute, second of creation)
2. Creation date (date, hour, minute, second)
3. Mapping information
4. Storage location
5. Organization
6. Enterprise
7. Value driver or external factor When bots in block 385 have identified and stored risk reduction activities in the risk reduction activity/product table (174) by enterprise, processing advances to a software block 386.

The software in block 386 checks the bot date table (149) and deactivates any extreme value bots with creation dates before the current system date. The software in block 386 then retrieves the information from the system settings table (140), the external database table (165), the element/external factor definition table (162), the element variables table (163) and the factor variables table (167) as required to initialize extreme value bots in accordance with the frequency specified by the user (20) in the system settings table (140).

Bots are independent components of the application that have specific tasks to perform. In the case of extreme value bots, their primary task is to identify the extreme values for each causal value driver and external factor by enterprise. The extreme value bots use the Blocks method and the peak over threshold method to identify extreme values. Other extreme value algorithms can be used to the same effect. Every extreme value bot activated in this block contains the information shown in Table 44.

TABLE 44

1. Unique ID number (based on date, hour, minute, second of creation)
2. Creation date (date, hour, minute, second)
3. Mapping information
4. Storage location
5. Organization
6. Enterprise
7. Method: blocks or peak over threshold
8. Value driver or external factor After the extreme value bots are initialized, they activate in accordance with the frequency specified by the user (20) in the system settings table (140). Once activated, they retrieve the required information and determine the extreme value range for each value driver or external factor. The bot saves the extreme values for each causal value driver and external factor in the statistics table (178) by enterprise in the value and risk system database (44) and processing advances to a block 387.

The software in block 387 checks the bot date table (149) and deactivates any forecast bots with creation dates before the current system date. The software in block 387 then retrieves the information from the system settings table (140), the external database table (165), the advanced finance system table (157), the element/external factor definition table (162), the element variables table (163), the financial forecasts table (168) and the factor variables table (167) as required to initialize forecast bots in accordance with the frequency specified by the user (20) in the system settings table (140).

Bots are independent components of the application that have specific tasks to perform. In the case of forecast bots, their primary task is to compare the forecasts stored for external factors and financial asset values with the information available from futures exchanges. Every forecast bot activated in this block contains the information shown in Table 45.

TABLE 45

1. Unique ID number (based on date, hour, minute, second of creation)
2. Creation date (date, hour, minute, second)
3. Mapping information
4. Storage location
5. Organization
6. Enterprise
7. External factor or financial asset
8. Forecast time period After the forecast bots are initialized, they activate in accordance with the frequency specified by the user (20) in the system settings table (140). Once activated, they retrieve the required information and determine if any forecasts need to be changed to bring them in line with the market data on future values. The bot saves the updated forecasts in the appropriate tables in the value and risk system database (44) by enterprise and processing advances to a block 388.

The software in block 388 checks the bot date table (149) and deactivates any scenario bots with creation dates before the current system date. The software in block 388 then retrieves the information from the system settings table (140), the operation system table (171), the external database table (165), the advanced finance system table (157), the element/external factor definition table (162) and the statistics table (178) as required to initialize scenario bots in accordance with the frequency specified by the user (20) in the system settings table (140).

Bots are independent components of the application that have specific tasks to perform. In the case of scenario bots, their primary task is to identify likely scenarios for the evolution of the causal value drivers and external factors by enterprise. The scenario bots use information from the advanced finance system, external databases and the forecasts completed in the prior stage to obtain forecasts for specific value drivers and factors before using the covariance information stored in the statistics table (178) to develop forecasts for the other causal value drivers and factors under normal conditions. They also use the extreme value information calculated by the previous bots and stored in the statistics table (178) to calculate extreme scenarios. Every scenario bot activated in this block contains the information shown in Table 46.

TABLE 46

1. Unique ID number (based on date, hour, minute, second of creation)
2. Creation date (date, hour, minute, second)
3. Mapping information
4. Storage location
5. Type: normal or extreme
6. Organization
7. Enterprise After the scenario bots are initialized, they activate in accordance with the frequency specified by the user (20) in the system settings table (140). Once activated, they retrieve the required information and develop a variety of scenarios as described previously. After the scenario bots complete their calculations, they save the resulting scenarios in the scenarios table (175) by enterprise in the value and risk system database (44) and processing advances to a block 389.

The software in block 389 checks the bot date table (149) and deactivates any simulation bots with creation dates before the current system date. The software in block 389 then retrieves the information from the system settings table (140), the operation system table (171), the advanced finance system table (157), the element/external factor definition table (162), the external database table (165), the statistics table (178), the scenarios table (175) and the generic risk table (169) as required to initialize simulation bots in accordance with the frequency specified by the user (20) in the system settings table (140).

Bots are independent components of the application that have specific tasks to perform. In the case of simulation bots, their primary task is to run three different types of simulations for the enterprise. The simulation bots run simulations of organizational financial performance and valuation using: the two types of scenarios generated by the scenario bots—normal and extreme, they also run an unconstrained genetic algorithm simulation that evolves to the most negative value. In addition to examining the economic factors that were identified in the previous analysis, the bots simulate the impact of event risks like fire, earthquakes, floods and other weather-related phenomena that are largely un-correlated with the economic scenarios. Event risks are as the name implies events that may have adverse financial impacts. They generally have a range of costs associated with each occurrence. For example, every time someone slips and falls in the factory it costs $2,367 for medical bills and lost time. The information on frequency and cost associated with these events is typically found in risk management systems. However, as discussed previously, external databases may also contain information that is useful in evaluating the likelihood and potential damage associated with these risks. Event risks can also be used to project the risk associated with competitor actions, government legislation and market changes. Every simulation bot activated in this block contains the information shown in Table 47.

TABLE 47

1. Unique ID number (based on date, hour, minute, second of creation)
2. Creation date (date, hour, minute, second)
3. Mapping information
4. Storage location
5. Type: normal, extreme or genetic algorithm
6. Risk factors: economic variability or event
7. Segment of value: current operation, real options, financial assets, derivatives or market sentiment
8. Organization
9. Enterprise After the simulation bots are initialized, they activate in accordance with the frequency specified by the user (20) in the system settings table (140). Once activated, they retrieve the required information and simulate the financial performance and value impact of the different scenarios on each segment of value by enterprise. After the simulation bots complete their calculations, the resulting risk forecasts are saved in the simulations table (177) and the xml summary table (166) by enterprise in the value and risk system database (44) and processing advances to a block 392.

The software in block 392 checks the system settings table (140) in the application database (50) to determine if the current calculation is a new calculation or a structure change. If the calculation is not a new calculation or a structure change, then processing advances to software block 222. Alternatively, if the calculation is new or a structure change, then processing advances to a software block 393.

The software in block 393 continually runs an analysis to define the optimal risk reduction strategy for the normal and extreme scenarios for each enterprise in the organization. It starts this process by retrieving data from the system settings table (140), the operation system table (171), the external database table (165), the advanced finance system table (157), the element/external factor definition table (162), the statistics table (178), the scenarios table (175) and the risk reduction activity/product table (174) by enterprise. The software in the block determines the optimal mix of risk reduction products (derivative purchase, insurance purchase, etc.) and risk reduction activities (reducing credit limits for certain customers, shifting production from high risk to lower risk countries, etc.) for the company under each scenario given the confidence interval established by the user (20) in the system settings table (140) using a linear programming optimization algorithm. A multi criteria optimization is also run at this stage to determine the best mix for reducing risk under combined normal and extreme scenarios. Other optimization algorithms can be used at this point to achieve the same result. In any event, the resulting product and activity mix for each set of scenarios and the combined analysis is saved in the optimal mix table (172) and the xml summary table (166) in the application database (50) by enterprise and the revised simulations are saved in the simulations table (177) by enterprise. The shadow prices from these optimizations are also stored in the risk reduction activity/product table (174) and the xml summary table (166) by enterprise for use in identifying new risk reduction products that the company may wish to purchase and/or new risk reduction activities the company may wish to develop. After the results of this optimization are stored in the value and risk system database (44) by enterprise, processing advances to a software block 394.

The software in block 394 checks the bot date table (149) and deactivates any impact bots with creation dates before the current system date. The software in block 394 then retrieves the information from the system settings table (140), the operation system table (171), the external database table (165), the advanced finance system table (157), the element/external factor definition table (162), the simulations table (177), the statistics table (178), the scenarios table (175) and the optimal mix table (172) as required to initialize value impact bots in accordance with the frequency specified by the user (20) in the system settings table (140).

Bots are independent components of the application that have specific tasks to perform. In the case of impact bots, their primary task is to determine the value impact of each risk reduction product and activity—those included in the optimal mix and those that are not—on the different scenarios by enterprise. Every impact bot contains the information shown in Table 48.

TABLE 48

1. Unique ID number (based on date, hour, minute, second of creation)
2. Creation date (date, hour, minute, second)
3. Mapping information
4. Storage location
5. Organization
6. Enterprise
7. Risk reduction product or activity After the software in block 394 initializes the value impact bots, they activate in accordance with the frequency specified by the user (20) in the system settings table (140). After being activated, the bots retrieve information as required to revise the simulations of enterprise performance and determine the risk reduction impact of each product on each simulation. The resulting forecast of value impacts are then saved in the risk reduction activity/product table (174) by enterprise as appropriate in the value and risk system database (44) before processing advances to a block 395.

The software in block 395 continually calculates the maximum enterprise value for each of the minimum risk strategies (normal, extreme and combined scenarios) defined in the previous section. The software in the block starts this process by retrieving data from the system settings table (140), the operation system table (171), the external database table (165), the advanced finance system table (157), the element/external factor definition table (162), the risk reduction activity/product table (174), the statistics table (178), the scenarios table (175), the financial forecasts table (168), the factor variables table (167) and the analysis definition table (146) as required to define and initialize a probabilistic simulation model for each scenario. The preferred embodiment of the probabilistic simulation model is a Markov Chain Monte Carlo model, however, other simulation models can be used with similar results. The model for each risk scenario is optimized using a mixed integer, linear program optimization algorithm to identify the maximum enterprise value given the scenario risk profile. Other optimization algorithms such as genetic algorithms can be used with similar results. After the point of maximum value and minimum risk is identified for each scenario, the enterprise risk levels are increased and reduced in small increments and the optimization process is repeated until the efficient frontier for each scenario has been defined. The baseline efficient frontier is based on the scenario that combined normal and extreme risk scenarios, however the results of all 3 sets of calculations (normal, extreme and combined) are saved in the report table (145) before processing advances to a block 222.

Reporting

The flow diagram in FIG. 9 details the processing that is completed by the portion of the application software (400) that performs special analyses, communicates the optimal mix to the purchasing system and the buyer's Value and Risk System before creating, displaying and optionally printing purchasing reports.

Processing in this portion of the application begins in software block 402. The software in block 402 retrieves information from the purchasing activity value table (151) as required to display the optimal mix of features and resources from the buyers frame. The optimal mix for other frames can also be displayed at this time. The software in block 402 then prompts the user (20) via the analysis definition window (905) to optionally edit the optimal mix that was displayed and/or to suggest other changes in the optimal mix. Any input regarding a change to the optimal mix is saved in the analysis definition table (146) before processing advances to a software block 403. The users input regarding changes in the optimal mix could also be forwarded to a simulation program at this point to determine if the user (20) specified changes had any material affect on the external factor consumption by the purchasing activity.

Figure 8:
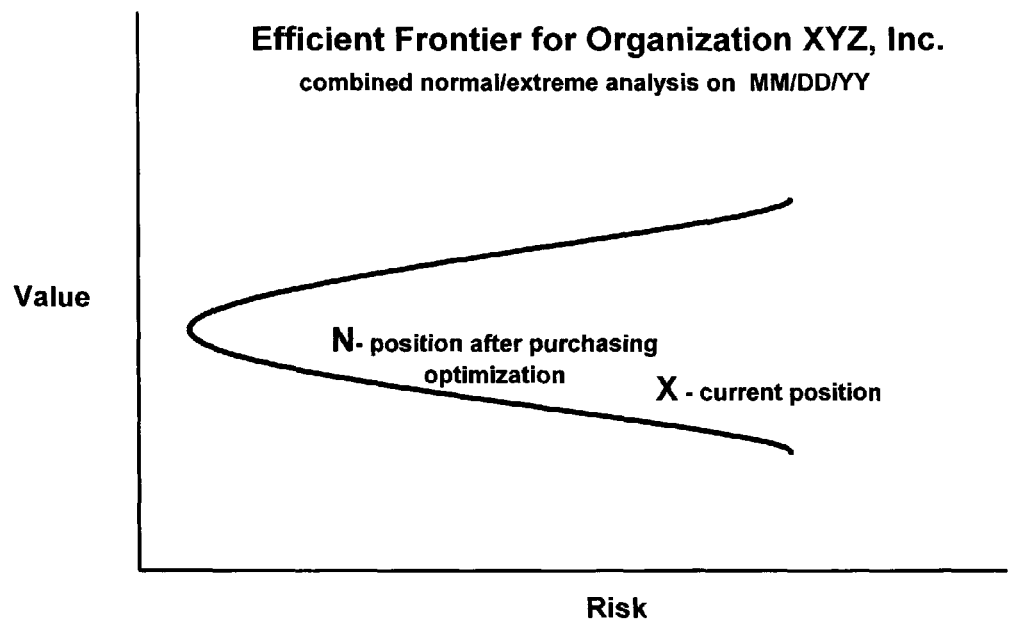
FIG. 8 is a sample report showing the efficient frontier for Organization XYZ, the current position of XYZ relative to the efficient frontier and the forecast of the new position of XYZ relative to the efficient frontier after the purchasing activity is optimized.

If the user (20) has specified changes to the optimal mix, then the software in block 403 completes an analysis of the impact of the changes from all relevant frames using the optimization process described previously for blocks 309 and 370. Other optimization algorithms can be used to the same effect. The software in block 403 also defines a probabilistic simulation model to analyze the proposed changes. The preferred embodiment of the probabilistic simulation model is a Markov Chain Monte Carlo model. However, other simulation models can be used with similar results. The model is defined using the information retrieved from the analysis definition table (146) and then iterated as required to ensure the convergence of the frequency distribution of the output variables. After the calculation has been completed, the software in block 403 saves the resulting information in the analysis definition table (146). After displaying the results of the optional change analysis using a report selection window (906), the user (20) is prompted to specify which set of features and feature options—the optimal mix or the mix defined by the user (20) should be passed on to purchasing system and the buyer's Value and Risk System. The mix selected for transmission is stored in the purchasing activity value table (151). After data storage is complete, the software in block 403 prompts the user (20) via the report selection window (906) to designate reports for creation, display and/or printing. One report the user (20) has the option of selecting at this point shows the value of each feature or resource to the purchasing activity and frame being analyzed. The report also summarizes the factors that led to the addition or exclusion of each feature and resource in the optimized purchasing activity mix. When the analysis is a comparison to a prior analysis, the report will clearly show the impact of changing one or more features or resources on the efficient frontier of the buyer as shown in FIG. 8. Other reports graphically display the sensitivity of the optimal mix to changes in the different feature and external factor prices for the different frames. After the user (20) has completed the review of displayed reports and the input regarding reports to print has been saved in the reports table (145) processing advances to a software block 404.

The software in block 404 retrieves the feature mix selected for transmission to the purchasing system database (30) and the buyer's Value and Risk System database (44) from the purchasing activity value table (151) and transmits it via a network (25) before advancing to a software block 405. The transmission of information by the software in block 404 could use the information developed in the prior stages of processing to activate purchasing bots to implement the optimal purchasing mix and report back as appropriate regarding progress toward implementing the purchasing plan. In any event, the software in block 405 checks the reports tables (145) to determine if any reports have been designated for printing. If reports have been designated for printing, then processing advances to a block 406 where the software in the block prepares and sends the designated reports to the printer (118). After the reports have been sent to the printer (118), processing advances to a software block 409. Alternatively, if the software in block 405 determines that no additional reports have been designated for printing, then processing advances to block 409.

The software in block 409 checks the system settings table (140) to see if the purchasing activity optimization is being run in continuous mode. If it is being run in continuous mode, then processing returns to software block 204 and the processing described previously is repeated. Alternatively, if the processing is not being run in continuous mode, then processing advances to a software block 415 where processing stops.

Thus, the reader will see that the system and method described above transforms extracted transaction data and information into a specification of the optimal purchasing mix for an enterprise or multi-enterprise organization. The level of detail contained in the purchase activity specification enables the analysis and simulation of the impact of changes in the purchasing activity mix on the future value and risk of the enterprise or multi-enterprise organization that is the buyer.

While the above description contains many specificities, these should not be construed as limitations on the scope of the invention, but rather as an exemplification of one preferred embodiment thereof. Accordingly, the scope of the invention should be determined not by the embodiment illustrated, but by the appended claims and their legal equivalents.

The invention claimed is:

1. A purchasing optimization system, comprising:
   a computer with a processor having circuitry to execute instructions; a storage device available to said processor with sequences of instructions stored therein, which when executed cause the processor to:
   prepare a plurality of data representative of an organization from a plurality of systems and external data sources for processing,
   obtain a plurality of purchasing related data that comprise one or more purchasing deliverables and one or more resources, a plurality of external factor prices, and one or more segment of value models that rely on a transformed data input and develops the data required to produce a matrix of value report for an organization,
   map an impact of a plurality of purchasing deliverables and a plurality of resources to one or more cells in a matrix of organization value and a matrix of organization risk;
   identify an optimal mix of purchasing features and resources; and
   display the optimal mix of purchasing features and resources
   where the purchasing related data comprises data from a purchasing system database that includes data for one or more purchasing deliverables, one or more purchasing features and one or more resources,
   and
   where the optimal mix is the mix that minimizes a total organization risk and maximizes a value of a current operation and a segment of value selected from the group consisting of derivative, investment, real option and combinations thereof.

2. The system of claim 1, wherein the one or more of segment of value models consist of a current operation segment of value model and models for the segments of value that have an impact on an organization value or an organization risk that are selected from the group consisting of derivative, investment, market sentiment and real option.

3. The system of claim 1, wherein the means for mapping the impact of a plurality of purchasing deliverables and a plurality of resources to one or more cells in the matrix of organization value or the matrix of organization risk further comprises matching data in accordance with a pre-defined xml schema.

4. The system of claim 1, wherein the means for mapping the impact of the plurality of purchasing deliverables and the plurality of resources to one or more cells in the matrix of organization value or the matrix of organization risk comprises a use of simulation system data to quantify an impact of one or more features on one or more purchased deliverables.

5. The system of claim 1, wherein the means for identifying the optimal mix of purchasing features and resources further comprises one or more non-linear mixed integer optimization algorithms.

6. The system of claim 1, wherein the matrix of organization value is defined by one or more elements of value, one or more external factors and up to five segments of value that have an impact on a value of an organization.

7. The system of claim 1, wherein the matrix of organization risk quantifies one or more risks that are selected from the group consisting of variability risks, contingent liabilities, event risks and combinations thereof.

8. The system of claim 6, wherein the one or more elements of value physically exist and are selected from the group consisting of alliances, brands, channels, customers, employees, equipment, information technology, intellectual property, investors, partnerships, processes, production equipment, vendors, visitors and combinations thereof.

9. The system of claim 6, wherein the one or more external factors are selected from the group consisting of numerical indicators of conditions external to the organization, numerical indications of prices external to the organization, numerical indications of organization conditions compared to external expectations of organization condition, numerical indications of the organization performance compared to external expectations of organization performance and combinations thereof.

10. The system of claim 6, wherein the five segments of value are selected from the group consisting of current operation, derivatives, investments, market sentiment, real options and combinations thereof.

11. A purchasing optimization method, comprising:
using a computer to perform the steps of:
preparing a plurality of data representative of an organization from a plurality of systems and external data sources for processing,
obtaining a plurality of purchasing related data that comprise one or more purchasing deliverables and one or more resources, a plurality of external factor prices, and one or more causal segment of value models that rely on a transformed data input,
mapping an impact of a plurality of purchasing deliverables and a plurality of resources to one or more cells in a matrix of organization value and a matrix of organization risk;
identifying an optimal mix of purchasing features and resources by using the segment of value models, and the mapped impacts to complete a simulation of an organization future value and risk and then analyzing the results; and
displaying the optimal mix of purchasing features and resources
where the one or more of segment of value models consist of a current operation and a real option segment of value model and models for the segments of value that have an impact on an organization value or an organization risk and are selected from the group consisting of derivative, investment and combinations thereof,
where the purchasing related data includes data for one or more purchasing deliverables, one or more purchasing features and one or more resources, and
where the optimal mix is the mix that minimizes a total organization risk and maximizes a value of a current operation segment and a real option segment of value.

12. The method of claim 11, wherein the display of the optimal mix of purchasing features and resources includes a graphical display of an impact of an implementation of optimized purchasing activity on a position of the organization relative to an efficient frontier.

13. The method of claim 11, wherein mapping the impact of the plurality of purchasing deliverables and the plurality of resources to one or more cells in the matrix of organization value or the matrix of organization risk further comprises matching data in accordance with a pre-defined xml schema.

14. The method of claim 11, wherein mapping the impact of the plurality of purchasing deliverables and the plurality of resources to one or more cells in the matrix of organization value or the matrix of organization risk further comprises a use of simulation system data to quantify an impact of one or more features on one or more purchased deliverables.

15. The method of claim 11, wherein identifying the optimal mix of purchasing features and resources further comprises completing an analysis using one or more non-linear mixed integer optimization algorithms.

16. The method of claim 11, wherein the matrix of organization value is defined by one or more elements of value, one or more external factors and up to four segments of value that have an impact on a value of an organization.

17. The method of claim 11, wherein the matrix of organization risk quantifies one or more risks selected from the group consisting of variability risks, event risks and combinations thereof by segment of value, element of value and external factor.

18. The method of claim 16, wherein the one or more elements of value physically exist and are selected from the group consisting of alliances, brands, channels, customers, employees, equipment, information technology, intellectual property, investors, partnerships, processes, production equipment, vendors, visitors and combinations thereof.

19. The method of claim 16, wherein the one or more external factors are selected from the group consisting of numerical indicators of conditions external to the organization, numerical indications of prices external to the organization, numerical indications of organization conditions compared to external expectations of organization condition, numerical indications of the organization performance compared to external expectations of organization performance and combinations thereof.

20. The method of claim 16, wherein the four segments of value are selected from the group consisting of current operation, derivatives, investments, real options and combinations thereof.

21. A program storage medium having sequences of instructions tangibly stored therein, which when executed cause the processors in at least one machine to perform steps, the steps, comprising:
preparing a plurality of data representative of an organization from a plurality of systems and external data sources in processing,
obtaining a plurality of purchasing related data that comprise one or more purchasing deliverables and one or more resources, a plurality of external factor prices, and one or more segment of value models,
mapping an impact of a plurality of purchasing deliverables and a plurality of resources to one or more cells in a matrix of organization value and a matrix of organization risk;
identifying an optimal mix of purchasing features and resources by using the segment of value models, the organization data, the feature data and the mapped impacts to complete a simulation of an organization market value and risk and then analyzing the results; and
displaying the optimal mix of purchasing features and resources
where the one or more of segment of value models consist of a current operation segment of value model and models for the segments of value that have an impact on an organization value or an organization risk that are selected from the group consisting of derivative, investment, market sentiment, real option and combinations thereof, where the purchasing related data includes data for one or more purchasing deliverables, one or more purchasing features and one or more resources, and where the optimal mix is the mix that minimizes a total organization risk and maximizes a value of a current operation segment of value and a value of segments of value selected from the group consisting of derivative, investment, market sentiment, real option and combinations thereof.

22. The program storage medium of claim 21, wherein the display of the optimal mix of purchasing features and resources includes a graphical display of an impact of an implementation of optimized purchasing activity on a position of the organization relative to an efficient frontier.

23. The program storage medium of claim 21, wherein mapping the impact of the plurality of purchasing deliverables and the plurality of resources to one or more cells in the matrix of value and risk further comprises matching data in accordance with a pre-defined xml schema.

24. The program storage medium of claim 21, wherein mapping the impact of the plurality of purchasing deliverables and the plurality of resources to one or more cells in a matrix of organization value or a matrix of organization risk further comprises a use of simulation system data to quantify an impact of one or more features on one or more purchased deliverables.

25. The program storage medium of claim 21, wherein identifying the optimal mix of purchasing features and resources further comprises completing an analysis using one or more non-linear mixed integer optimization algorithms.

26. The program storage medium of claim 21, wherein the matrix of organization value is defined by one or more elements of value, one or more external factors, and up to five segments of value that have an impact on a value of an organization.

27. The program storage medium of claim 21, wherein the matrix of organization risk quantifies one or more risks that are selected from the group consisting of variability risks, contingent liabilities, event risks and combinations thereof.

28. The program storage medium of claim 26, wherein the one or more elements of value physically exist and are selected from the group consisting of alliances, brands, channels, customers, employees, equipment, information technology, intellectual property, investors, partnerships, processes, production equipment, vendors, visitors and combinations thereof.

29. The program storage medium of claim 26, wherein the one or more external factors are selected from the group consisting of numerical indicators of conditions external to the organization, numerical indications of prices external to the organization, numerical indications of organization conditions compared to external expectations of organization condition, numerical indications of the organization performance compared to external expectations of organization performance and combinations thereof.

30. The program storage medium of claim 26, wherein the five segments of value are selected from the group consisting of current operation, derivatives, investments, market sentiment, real options and combinations thereof.

31. A system for optimizing a performance of a subset of an organization, comprising:
a computer with a processor having circuitry to execute instructions; a storage device available to said processor with sequences of instructions stored therein, which when executed cause the processor to:

prepare a plurality of data representative of an organization from a plurality of systems and external data sources in processing, obtain a plurality of data related to a subset of an organization performance and the organization as a whole that comprise one or more subset features, a plurality of resource related data, and one or more causal segment of value models that rely on a transformed data input, map an impact of a plurality of subset features and a plurality of resources to one or more cells in a matrix of organization value and a matrix of organization risk;

identify an optimal mix of subset features and resources; and display the optimal mix of subset features and resources
where the optimal mix is the mix that minimizes an organization total risk while considering a portfolio effect associated with each of one or more organization risks and maximizes a value of a current operation segment of value and a value of segments of value selected from the group consisting of derivative, investment, market sentiment, real option and combinations thereof, and where the one or more of segment of value models consist of a current operation segment of value model and models for the segments of value that have an impact on an organization value or an organization risk and are selected from the group consisting of derivative, investment, market sentiment, real option and combinations thereof.

32. The system of claim 31, wherein the display of the optimal mix of subset features and resources includes a graphical display of an impact of an implementation of optimized subset activity on a position of the organization relative to an efficient frontier.

33. The system of claim 31, wherein the means for mapping the impact of the plurality of subset features and the plurality of resources to one or more cells in a matrix of value or risk further comprises matching data in accordance with a pre-defined xml schema.

34. The system of claim 31, wherein the means for mapping the impact of the plurality of subset features and the plurality of resources to one or more cells in the matrix of organization value or the matrix of organization risk further comprises a use of simulation system data to quantify an impact of one or more features on one or more cells in a matrix of market value.

35. The system of claim 31, wherein the means for identifying the optimal mix of subset features and resources further comprises non-linear mixed integer optimization algorithms.

36. The system of claim 31, wherein the matrix of organization value is defined by one or more elements of value, one or more external factors, and up to five segments of value that have an impact on a value of an organization.

37. The system of claim 31, wherein the matrix of organization risk quantifies one or more risks selected from the group consisting of variability risks, event risks and combinations thereof by segment of value, element of value and external factor.

38. The system of claim 36, wherein the one or more elements of value physically exist and are selected from the group consisting of alliances, brands, channels, customers, employees, equipment, information technology, intellectual property, investors, partnerships, processes, production equipment, vendors, visitors and combinations thereof where one or more elements of value are selected from the group consisting of alliances, brands, channels, customers, customer relationships, employees, employee relationships, equipment, knowledge, information technology, intellectual property, investors, partnerships, processes, production equipment, quality, vendors, vendor relationships, visitors and combinations thereof.

39. The system of claim 36, wherein the one or more external factors are selected from the group consisting of numerical indicators of conditions external to the organization, numerical indications of prices external to the organization, numerical indications of organization conditions compared to external expectations of organization condition, numerical indications of the organization performance compared to external expectations of organization performance and combinations thereof.

40. The system of claim 36, wherein the five segments of value are selected from the group consisting of current operation, derivatives, investments, market sentiment, real options and combinations thereof.

41. The system of claim 31, wherein the subset of an organization performance is selected from the group consisting of alliance, brand, channel, contingent liability, customer, customer relationship, derivative, employee, employee relationship, external factor, information technology, intellectual property, knowledge, market volatility, partnership, production equipment, vendor, vendor relationship, weather risk and combinations thereof.

42. A method for optimizing a performance of a subset of an organization, comprising:
using a computer to perform the steps of:
transforming a plurality of data representative of an organization from a plurality of systems and external data sources into a format for processing,
obtaining a plurality of data related to a subset of an organization performance and the organization as a whole that comprise one or more subset features, a plurality of resource related data, and one or more causal segment of value models,
mapping an impact of a plurality of subset features and a plurality of resources to one or more cells in a matrix of organization value and a matrix of organization risk;
identifying an optimal mix of subset features and resources by using the segment of value models, organization data, feature data and the mapped impacts to complete a simulation of an organization future value and risk and then analyzing the results; and
displaying the optimal mix of subset features and resources where the optimal mix is the mix that minimizes a total organization total risk and maximizes a value of a value of one or more segments of value selected from the group consisting of current operation, derivative, investment, market sentiment, real option and combinations thereof, and
where the one or more of segment of value models are a current operation segment of value model and models for the segments of value that have an impact on an organization value or an organization risk and are selected from the group consisting of derivative, investment, real option and combinations thereof.

43. The method of claim 42, wherein the display of the optimal mix of subset features and resources includes a graphical display of an impact of an implementation of optimized subset activity on a position of the organization relative to an efficient frontier.

44. The method of claim 42, wherein mapping the impact of the plurality of subset features and the plurality of resources to one or more cells in a matrix of organization value and a matrix of organization risk further comprises matching data in accordance with a pre-defined xml schema.

45. The method of claim 42, wherein mapping the impact of a plurality of subset features and a plurality of resources to one or more cells in the matrix of organization value and the matrix of organization risk further comprises a use of simulation system data to quantify an impact of one or more features on one or more cells in a matrix of value and risk.

46. The method of claim 42, wherein identifying the optimal mix of facet features and resources further comprises completing an analysis using one or more non-linear mixed integer optimization algorithms.

47. The method of claim 42, wherein the matrix of value is defined by one or more elements of value, one or more external factors and up to four segments of value that have an impact on a value of an organization.

48. The method of claim 42, wherein the matrix of risk quantifies one or more risks that are selected from the group consisting of variability risks, contingent liabilities, strategic risks, market volatility risks, event risks and combinations thereof.

49. The method of claim 47, wherein the one or more elements of value physically exist and are selected from the group consisting of alliances, brands, channels, customers, employees, equipment, information technology, intellectual property, investors, partnerships, processes, production equipment, vendors, visitors and combinations thereof.

50. The method of claim 47, wherein the one or more external factors are selected from the group consisting of numerical indicators of conditions external to the organization, numerical indications of prices external to the organization, numerical indications of organization conditions compared to external expectations of organization condition, numerical indications of the organization performance compared to external expectations of organization performance and combinations thereof.

51. The method of claim 47, wherein the four segments of value are selected from the group consisting of current operation, derivatives, investments, real options and combinations thereof.

52. The method of claim 42, wherein the subset of the organization performance is selected from the group consisting of alliance, brand, channel, contingent liability, customer, derivative, employee, information technology, intellectual property, partnership, production equipment, vendor, and combinations thereof.

53. A program storage medium having sequences of instructions tangibly stored therein, which when executed cause the processors in at least one computer to perform steps, the steps, comprising:
transforming a plurality of data representative of an organization from a plurality of systems and external data sources into a format for processing,
obtaining a plurality of data related to a performance of a subset of an organization and the organization as a whole that comprise one or more subset features, a plurality of resource related data, and one or more causal segment of value models,
mapping an impact of a plurality of subset features and a plurality of resources to one or more cells in a matrix of organization value and a matrix of organization risk;
identifying an optimal mix of subset features and resources by using the organization data, feature data, the segment of value models and the mapped impacts to simulate an organization future value and risk and then analyzing the results; and displaying the optimal mix of subset features and resources where the optimal mix is the mix that minimizes an organization total risk while considering a portfolio effect associated with each of one or more organization risks and maximizes a value of a current operation, a real option and a derivative segment of value, and where the one or more of causal segment of value models are a current operation and a real option segment of value model and models for the segments of value that have an impact on an organization value or an organization risk and are selected from the group consisting of derivative, investment, market sentiment and combinations thereof.

54. The program storage medium of claim 53, wherein the display of the optimal mix of subset features and resources includes a graphical display of an impact of an implementation of optimized subset activity on a position of the organization relative to an efficient frontier.

55. The program storage medium of claim 53, wherein the means for mapping the impact of a plurality of subset features and a plurality of resources to one or more cells in the matrix of organization value or the matrix of organization risk further comprises matching data in accordance with a pre-defined xml schema.

56. The program storage medium of claim 53, wherein mapping the impact of a plurality of subset features and a plurality of resources to one or more cells in the matrix of organization value and the matrix of organization risk further comprises a use of simulation system data to quantify an impact of one or more features on one or more cells.

57. The program storage medium of claim 53, wherein identifying the optimal mix of facet features and resources further comprises completing an analysis using one or more non-linear mixed integer optimization algorithms.

58. The program storage medium of claim 53, wherein the matrix of value is defined by one or more elements of value, one or more external factors, and up to five segments of value that have an impact on a value of an organization.

59. The program storage medium of claim 53, wherein the matrix of risk quantifies one or more risks selected from the group consisting of variability risks, contingent liabilities, strategic risks, market volatility risks, event risks and combinations thereof by segment of value, element of value and external factor.

60. The program storage medium of claim 58, wherein the one or more elements of value physically exist and are selected from the group consisting of alliances, brands, channels, customers, employees, equipment, information technology, intellectual property, investors, partnerships, processes, production equipment, vendors, visitors and combinations thereof.

61. The program storage medium of claim 58, wherein the one or more external factors are selected from the group consisting of numerical indicators of conditions external to the organization, numerical indications of prices external to the organization, numerical indications of organization conditions compared to external expectations of organization condition, numerical indications of the organization performance compared to external expectations of organization performance and combinations thereof.

62. The program storage medium of claim 58, wherein the five segments of value are selected from the group consisting of current operation, derivatives, investments, market sentiment, real options and combinations thereof.

63. The program storage medium of claim 52, wherein the subset of an organization performance is selected from the group consisting of alliance, brand, channel, customer, employee, information technology, intellectual property, partnership, production equipment, vendor, and combinations thereof.

* * * * *